United States Patent
Landry et al.

[11] Patent Number: 6,108,071
[45] Date of Patent: Aug. 22, 2000

[54] SPEED AND POSITION MEASUREMENT SYSTEM

[75] Inventors: Benjamin Joel Landry; Patrick Nolan Whaley, both of Lawrenceville; Paul R. Akins; Oscar Jerome Brittingham, IV, both of Norcross, all of Ga.

[73] Assignee: Laser Atlanta, Norcross, Ga.

[21] Appl. No.: 08/990,071

[22] Filed: Dec. 12, 1997

[51] Int. Cl.[7] .................................................. G01C 3/08
[52] U.S. Cl. ...................... 356/5.05; 356/5.01; 356/5.08; 356/28
[58] Field of Search ................. 356/28, 28.5, 5.01–5.15, 356/141.1

[56] References Cited

U.S. PATENT DOCUMENTS

| | | | |
|---|---|---|---|
| 4,518,256 | 5/1985 | Schwartz | 356/28 |
| 5,204,731 | 4/1993 | Tanaka et al. | |
| 5,221,956 | 6/1993 | Patterson et al. | 356/28 |
| 5,291,262 | 3/1994 | Dunne | |
| 5,523,835 | 6/1996 | Tanaka | 356/5.05 |
| 5,552,878 | 9/1996 | Dillard | 356/5.07 |
| 5,600,436 | 2/1997 | Gudat | 356/141.3 |
| 5,612,779 | 3/1997 | Dunne | 356/5.01 |
| 5,644,386 | 7/1997 | Jenkins et al. | 356/4.01 |
| 5,760,748 | 6/1998 | Beckingham | 356/4.06 |
| 5,815,251 | 9/1998 | Ehbets et al. | 356/5.01 |
| 5,859,693 | 1/1999 | Dunne et al. | 356/4.01 |

*Primary Examiner*—Stephen C. Buczinski
*Attorney, Agent, or Firm*—Fleshner & Kim, LLP

[57] ABSTRACT

A speed and/or position determining device for determining the speed or position of a target object includes a head-up display for simultaneously viewing both the target object and an image of information regarding the target object. An optical projection system for projecting the information image from a light emitting display to a combining sight of the head-up display passes along a short straight optical axis between the light emitting display and the combining sight. The device may also incorporate a novel method for determining the length of a time period that elapses between the time that a radiation emitter emits a pulse of radiation and the time a reflected portion of the emitted pulse of radiation is received back at the device. The novel method makes use of one or more electronic delay modules having a plurality of tap lines. An electronic state of each of the tap lines changes as a signal input to the delay module propagates through the delay module. In addition, the device may determine the pulse width of a reflected pulse of radiation, and use this information to calculate a more accurate time of flight for the pulse of radiation. The device may also incorporate a global positioning system receiver and antenna, an electronic compass, and an electronic inclinometer that are integrally mounted in the device. The device can then determine the position of a target object based on the position sensed through the global positioning system receiver and the distance, bearing, and inclination angle from the device to the target object.

16 Claims, 17 Drawing Sheets

SPEED AND POSITION MEASUREMENT SYSTEM

BACKGROUND OF THE INVENTION

1. Field of the Invention

The invention relates to an apparatus and method for determining the speed and position of an object. In particular, the invention relates to a device incorporating a rangefinder, inclinometer, compass and global positioning system receiver, wherein the device is capable of determining the location and/or speed of a target object.

2. Background of the Related Art

A laser rangefinder allows an operator to determine the distance to a target object with great accuracy. A laser rangefinder that incorporates a compass and an inclinometer can also enable an operator to determine the bearing (azimuth) and height (elevation), respectively, of a target object with great accuracy.

Such laser rangefinders have found many applications in surveying and mapping. In surveying, a single surveyor, instead of two, can measure distance, bearing, and inclination with great accuracy, as illustrated in U.S. Pat. No. 5,291,262 to Dunne, the contents of which are hereby incorporated by reference.

Laser rangefinders have also been incorporated in speed determination devices, such as the laser speed detectors used by law enforcement personnel. Examples of such devices are disclosed in U.S. Pat. No. 5,221,956 to Patterson et al. and U.S. Pat. No. 5,359,404 to Dunne, the contents of both of which are hereby incorporated by reference. In these devices, the rangefinder determines the distance to a target object at a plurality of different points in time. The determined distances and the elapsed times between measurements are then used to calculate the speed of the target.

In laser rangefinding and speed determination, typically, a short duration infrared laser light pulse is transmitted from the laser rangefinder to the target. The target reflects a portion of the laser pulse back to the laser rangefinder. The laser pulse transmitted from the rangefinder will diverge as it travels from the laser rangefinder to the target. After the laser pulse is reflected from the target, it will further diverge as it travels back toward the rangefinder. The power of the reflected laser pulse that is detected by the laser rangefinder is therefore a function of the effective solid angle subtended by the detecting portion of the laser rangefinder relative to the target, the divergence of the beam, the initial beam intensity and the reflectivity of the target.

Typically, a time period is measured between the time a transmitted pulse leaves the laser rangefinder and the time the reflected pulse from the target is received back at the laser rangefinder. This time period, which is typically called the time of flight, allows the rangefinder to determine the distance between the rangefinder and the target. To determine when the time period starts, some rangefinders cause a portion of the transmitted laser pulse to be redirected to a detector. The detector can then generate a signal that represents the firing time (zero time reference) of the transmitted pulse, as illustrated in the above-cited '262 patent. When a reflected light pulse is received back at the rangefinder, the detector will generate another signal that represents the end of the measured time period.

Most rangefinders use a counter to determine the time period that elapses between transmission of a pulse and receipt of the reflected pulse. The counter will count the number of clock signals that are output from a clock device between the time the transmitted pulse leaves the rangefinder, and the time the reflected laser pulse is received back at the rangefinder. Unfortunately, simply counting clock pulses and converting the number of pulses into a time period will not provide the degree of time keeping accuracy required to provide precise position or range measurements.

Because a fractional time period will usually elapse between the point in time when a laser pulse leaves the rangefinder and the point in time when the clock outputs a first signal, failing to account for the fractional time period can lead to inaccuracies in measurement. Likewise, inaccuracies can result if the rangefinder fails to account for a fractional time period that elapses between the point in time when the clock outputs its last signal and the point in time when a reflected laser pulse is received back at the rangefinder. To ensure the most accurate distance measurement, it is necessary for the rangefinder to have some means of determining the length of the fractional time periods.

Various methods for viewing a target and for displaying relevant range, azimuth, inclination, and speed information have also been disclosed. This includes using a magnifying scope for viewing the target, and using a separate display for displaying target information. Because the target and the target information are displayed at different locations, an operator viewing the target must reposition his head and refocus his eyes, or at least refocus his eyes, to view target information, or vice versa. In either case, this approach requires an operator to take his eyes off the target while viewing the relevant target information. Thus, the operator is not permitted to simultaneously view the target and the target information. Lack of simultaneity is a disadvantage because possible misalignment of the laser rangefinder may occur when the target is not in the operator's view.

In contrast, a laser rangefinder incorporating a head-up display (HUD) allows a user to simultaneously view the target and target information. Typically head-up displays have been designed to permit an operator to view two different inputs of information at the same time. HUDs are time saving and have been successfully employed in many military applications.

The above-cited '956 patent discloses a rangefinder that incorporates a HUD specifically designed to work with an off-the-shelf light emitting diode (LED). The head-up display projects target information to an operator while the operator simultaneously views a target. However, in the '956 patent, a two lens element folded telephoto system having a folding mirror in the optical path is used to project the target information from the off-the-shelf LED readout to the operator by way of the HUD. The telephoto system disclosed in the '956 patent provides an effective focal length much greater than the physical length of the lens system to save space, while forming an image of the off-the-shelf LED.

Although a folded telephoto lens system for a head-up display can save space by providing a reduced physical length, it has several important disadvantages. First, such a system requires two separate focusing lenses: a positive power doublet lens, and a negative power lens. The system also requires a folding mirror as an additional optical element. The use of two focusing lenses and a folding mirror adds bulk, weight and cost to the overall system. Moreover, because this system is a compound lens system, the optical elements must be carefully aligned with respect to one another. A compound lens system may also be more fragile, and certainly has more elements to break or misalign. For example, a compound lens system may require exceptionally careful optical re-alignment if dropped to the ground or if accidentally struck, compared to lens systems avoiding compound lenses or folding mirrors. The above-cited disadvantages and problems are particularly problematic in a device intended for field use at construction and blast sites.

Typically, an image of a target object must be transmitted through a combining element of a head-up display, while an image of target information is projected onto and is reflected from the combining element. Head-up displays can have problems optimizing the transmissivity and reflectivity of the combining element that presents the user with images of both the target object and relevant target data. Previous laser rangefinders employing HUDs, including the one disclosed in the '956 patent, have not optimized these properties for both the prominent visible (photopic) wavelengths reflected from a target and the prominent visible wavelengths projected from a target information display.

In addition, some HUDs suffer from chromatic shading or shifting of a target image when viewed through the HUD. Typically, the target image is shifted toward the blue end of the spectrum. The target image appears bluish and darkened to an operator because the required filtering removes red light from the light that passes through a viewfinder to the operator's eye. This darkening of the target image is obviously disadvantageous for good viewing of the target image by the operator.

The devices disclosed in the '956 and '262 patents use a backlit targeting reticle (or "cross-hairs"). This is disadvantageous because it requires a light source in addition to the respective reticles themselves. In addition, the device disclosed in the '956 patent uses off-the-shelf LEDs, separate from the device that creates an image of the reticule, to create an image of target information. The LEDs are necessarily mounted on a different substrate than the reticle, which increases the cost, weight and size of the device. Moreover, these LEDs, being off-the-shelf, are not specifically matched to the folded telephoto lens system employed therein. Such a system is complex, and does not provide optimum optical clarity.

There are other important issues that require attention in laser rangefinders. One problem is the effect temperature variations have on optical and mechanical elements. The expansion and contraction that occurs due to temperature variations can result in significant imprecision in measurements of relevant target information, or loss of range. In addition, previous laser rangefinders have required the use of a separate power pack containing a power supply or batteries. This also tends to add cost, weight and complexity to the system.

Prior art laser rangefinders have utilized the functions of the Global Position System (GPS) to locate the exact position of measured objects. Typically, a separate GPS receiver is connected to a rangefinder via a data cable through a data input port. The rangefinder uses the location of the GPS receiver, and information derived from its own sensors, to determine the position of a measured object. Unfortunately, this arrangmenet requires the use of two separate devices, the rangefinder and a separate GPS receiver, which is cumbersome and impractical for some types of field work.

Rangefinders used in survey work have also been used to download data to a separate storage device, such as a computer or a portable data storage device. Typically, the rangefinder includes a data output port which is connected to the separate storage device via a data cable. The storage device runs a program which captures and stores information generated by the rangefinder. In the past, no rangefinder has included a simple or convenient integral means for automatically recording data generated while performing rangefinding, surveying or speed determining functions. It has always been necessary to download such data to a separate storage device through a data cable, which is cumbersome and requires extra equipment.

The above references are incorporated by reference herein where appropriate for appropriate teachings of additional or alternative details, features and/or technical background.

SUMMARY OF THE INVENTION

The invention is a device and method for determining the range and/or speed of a target object which overcomes the above-described problems of the prior art. The invention may be embodied in an inexpensive, lightweight, compact and rugged speed detector and rangefinder.

The device may include a viewfinder having a target sight and a head-up display which allows a user to observe both a target object and information regarding the target object simultaneously through the viewfinder. The device does not require a folded telephoto lens, or a compound lens system to project an image of target information on the head-up display. In addition, elements for creating an image of target information and a reticule for aiming the device at a target object are incorporated into a single light emitting display. The optical elements used in the head-up display are optimized for transmissivity and reflectivity such that the viewfinder of the head-up display accurately portrays both a target image and an image of the target information. Further, the target information and reticule image is projected onto the viewfinder such that they appear to be a great distance away from the operator, which allows the operator to focus his eyes at infinity and easily simultaneously see both the target object and the target information.

The device also incorporates novel methods of determining the range and/or speed of a moving object. The novel methods determine the length of a fractional time period between the time that a pulse of radiation is transmitted and the time that a first clock signal is generated, and the length of a fractional time period between the time that the last clock signal is generated and the time that a reflected pulse of radiation is received, using one or more electronic delay modules. In particularly preferred embodiments of the present invention, when a laser emitter emits a pulse of laser radiation toward a target object, a signal will be input into an electronic delay module. Then, when a next clock pulse occurs, the states of the tap lines of the delay module will be latched. Similarly, when a reflected pulse of laser radiation is detected, a signal will be input to the electronic delay module. The states of the tap lines of the delay module will be latched upon occurrence of the next clock signal. The tap line state information will be used along with a time represented by the integral number of clock periods occurring between the emission of a pulse, and the detection of a return pulse, to determine a time of flight for the pulse of laser radiation. The novel methods may also determine the width of a reflected laser pulse and use this information to apply a correction factor to the determined time of flight. The correction factor accounts for various environmental and device factors that can attenuate the leading edge of the pulse of reflected radiation to the degree that it is undetectable by the radiation detector.

The device may also incorporate a power supply, in the form of rechargable batteries, which is integrally mounted in a detachable handle of the unit. This eliminates the need for an exterior power supply or an exterior battery pack, and serves to balance the device so that it is easier to control.

The device may incorporate an integrally mounted GPS receiver and antenna so that the device can determine the position of target objects without being connected to an external GPS receiver. The device might also include a differential receiver and a differential antenna for receiving a GPS correction signal. The incorporation of an integral GPS receiver system further simplifies the device and adds to its portability and ease of use.

The device may incorporate a PCMCIA card slot that allows the device to read data from and record data to a typical PCMCIA card used with portable personal computers. This allows the device to download new programs from a card to enable the device to accomplish news types of asset surveying or new types of speed detection. The device may also be capable of recording surveying or speed information directly to a PCMCIA card, which can then be removed from the device and inserted into a computer to download the data to the computer.

A device embodying the invention may also be pre-programmed to carry out certain forms of asset surveying. For instance, the device may be pre-programmed to accomplish horizontal/vertical profiling, to determine the volume of three dimensional objects, or to determine the area of two dimensional plots.

Additional advantages, objects, and features of the invention will be set forth in part in the description which follows and in part will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
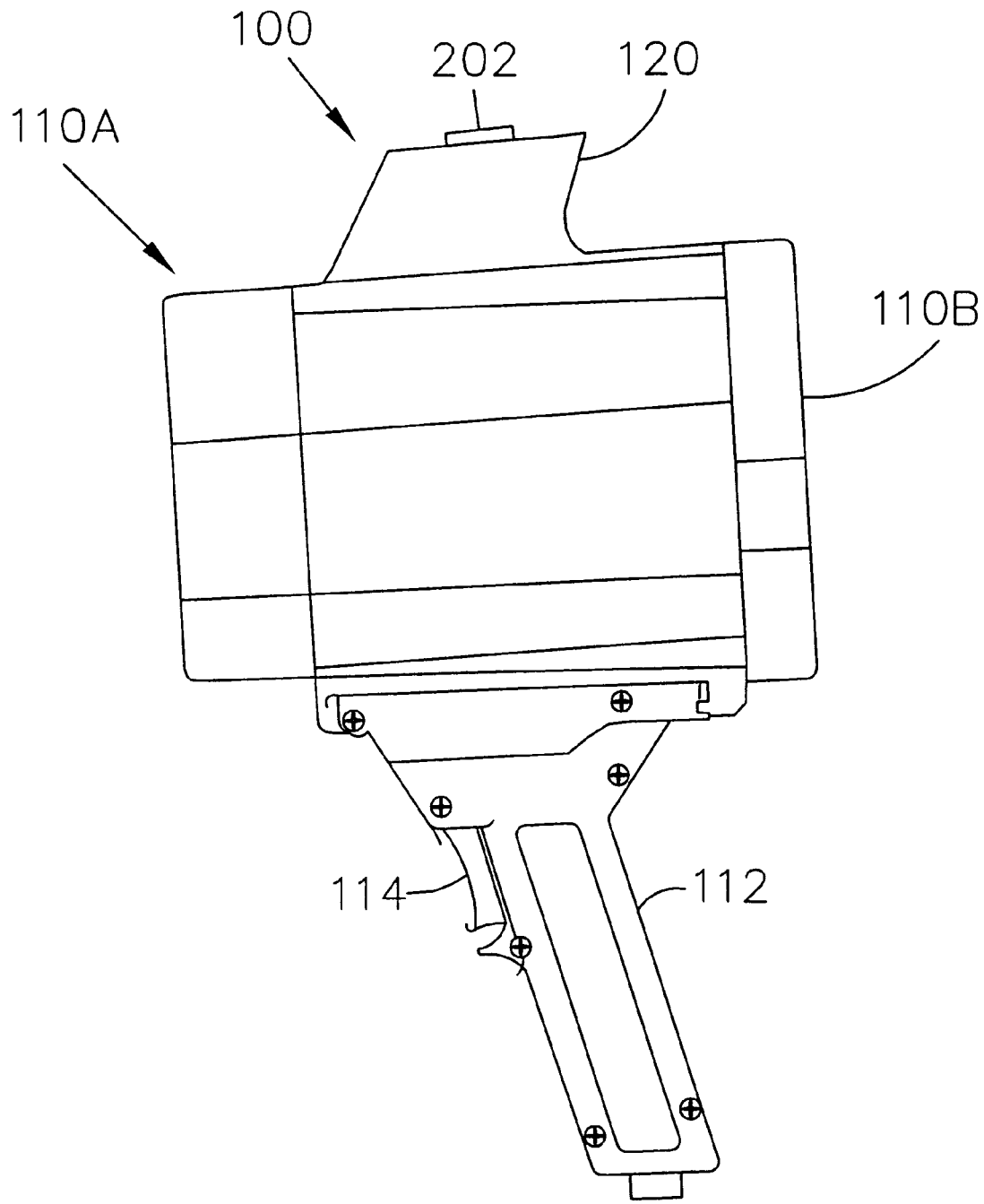
FIG. 1 is a side view of a device embodying the invention.
Figure 2:
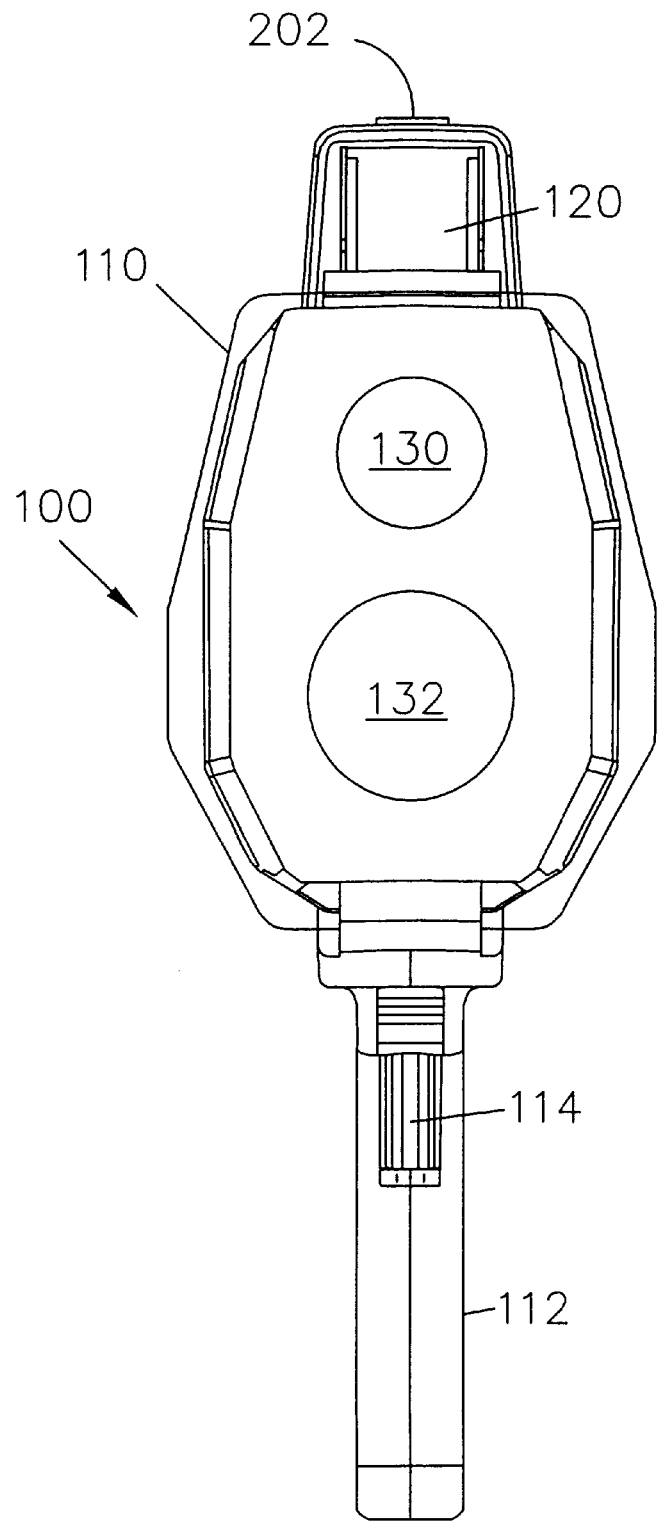
FIG. 2 is a front view of a device embodying the invention.
Figure 3:
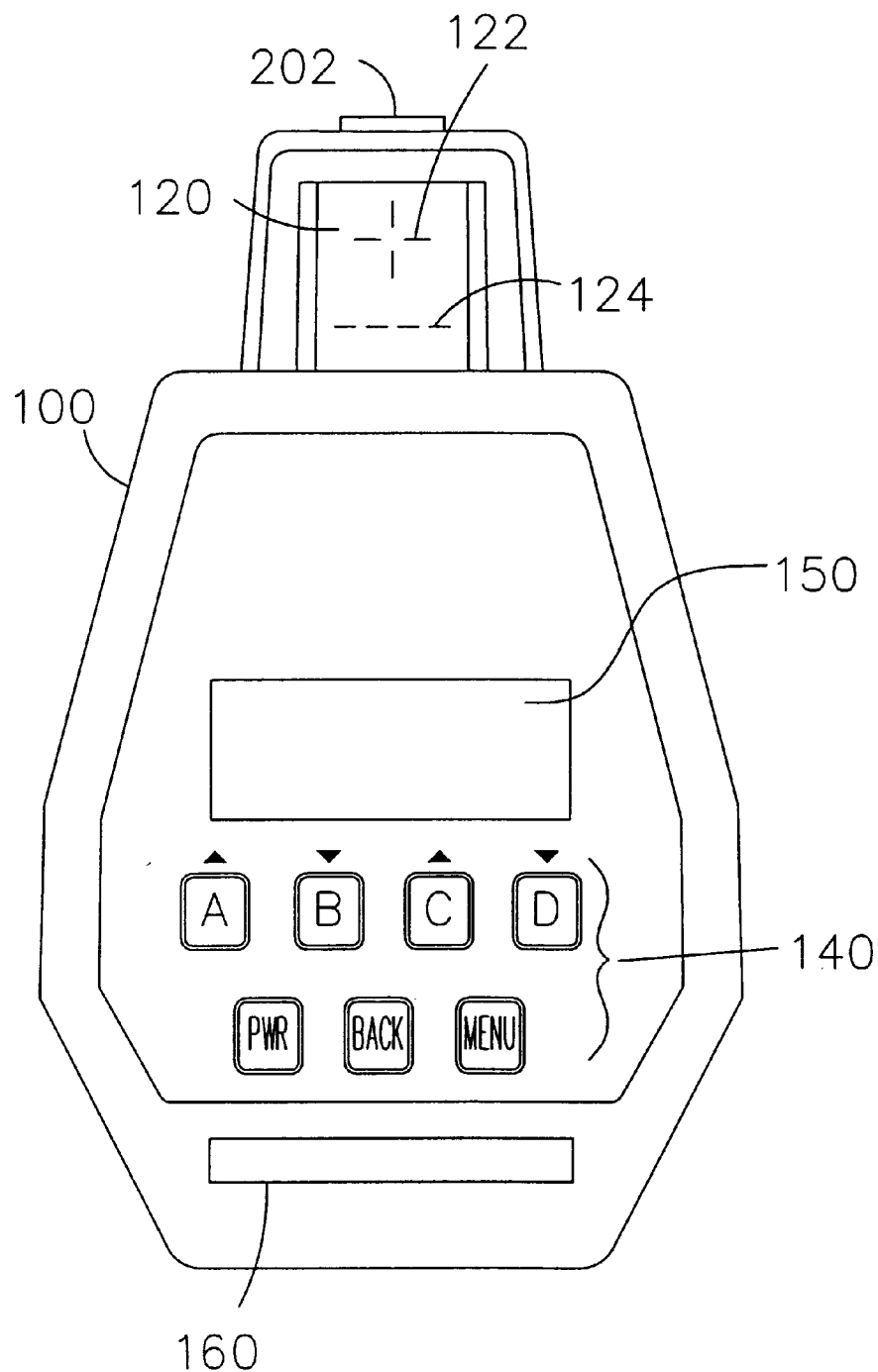
FIG. 3 is a rear view of a device embodying the invention.

The exterior of a device embodying the invention is shown in FIGS. 1, 2 and 3. The device 100 has a housing 110 which encloses an electromagnetic radiation emitter, a radiation detector, a GPS receiver and antenna, a battery power source and various displays, control buttons and electronic processing circuits. As seen in FIGS. 1–3, the housing 110 includes a front housing portion 110A and a rear housing portion 110B. A combined sight assembly 120 is located on top of the device. An antenna module 202 is mounted on top of the combined sight assembly 120. The antenna module 220 may house a GPS antenna, or both a GPS antenna and a differential signal receiving antenna. A handle 112 is attached to the bottom of the unit and incorporates a trigger switch 114. Rechargable batteries may be located in the handle 112, and the handle 112 may be removably attached to the device 100.

As best seen in FIG. 2, a transmitting lens 130 is mounted on the front of the unit. A receiving lens 132 is mounted underneath the transmitting lens 130. Electromagnetic radiation is projected through the transmitting lens 130 toward a target object. A portion of the radiation is then reflected from the target object back toward the device 100, where it enters the receiver lens 132 and passes to a detector.

The device is shown in FIG. 3 with the removable handle 112 detached from the housing 110. As shown in FIG. 3, a rear display 150 and a keypad 140 are mounted on the back of the device. The combining sight assembly 120 includes a projected reticule 122 and a target information display area 124.

The keyboard 140 can be used to manipulate information appearing in the display screen 150, or to instruct the device to perform various functions. The various buttons on the keyboard 140 can be used to select options from a menu, or to input data into the device. Target object information, such as range, bearing, azimuth and object speed can be displayed on the display screen 150, and/or on the information area 124 on the combined sight 120.

A PCMCIA card slot 160 is located underneath the keypad area 140. A PCMCIA card can be inserted into the slot, and data can be exchanged between the device and the card. This allows new programs to be loaded into the device, such as a new program that would allow the device to accomplish surveying operations. Also, data acquired by the device can be stored on a PCMCIA card inserted in the slot 160 as surveying or speed detection operations are conducted. The card could then be removed, and the recorded data could be transferred to a separate computer.

Figure 4:
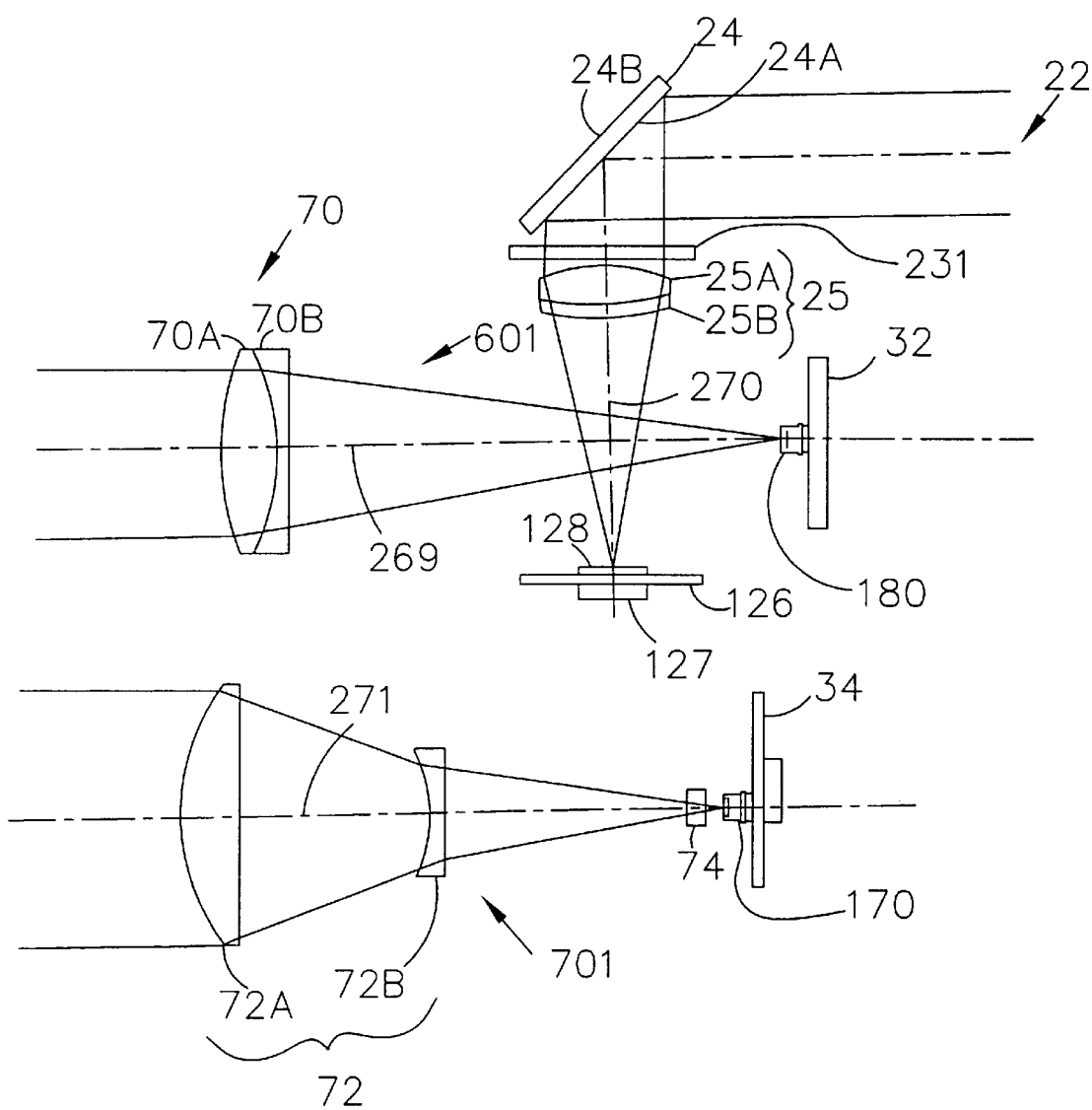
FIG. 4 is a diagram showing emitting and receiving elements and elements of a head-up display of a device embodying the invention.

FIG. 4 is a diagram showing the orientation of various optical elements contained within the housing. As shown in FIG. 4, an electromagnetic radiation emitter 180 emits radiation along a transmitting optical axis 269 to a combined lens element 70, which includes lens elements 70A and 70B. The combined lens element 70 collimates the radiation so that the radiation exiting the combined lens 70 travels in a direction parallel to the transmitting optical axis 269.

In a preferred embodiment, the emitter 180 would be capable of emitting an individual pulse of radiation, or a series of pulses of radiation in a pulse train. In the preferred embodiment, the firing rate of the emitter 180 is 238 hertz, which means that the device could emit approximately 238 pulses of radiation per second toward a target.

The emitter may be a diode of the gallium arsenide (GaAs) type for emitting laser radiation, or of other types, as would be understood by persons skilled in the art. In a preferred embodiment, the emitter is a GaAs type, producing laser radiation having a wavelength of about 905 nanometers, with a peak power output of approximately 50 watts and a 30–50 nanosecond pulse width. Other emitters capable of emitting other forms of electromagnetic radiation other than laser light could also be used. All that is required is that the radiation is reflected from a target object back to a detector on the device. While numerous references are made to laser radiation (which is the presently preferred embodiment) in the remainder of the specification, it is to be understood that any form of electromagnetic radiation could be used without departing from the spirit and scope of the invention.

Radiation reflected from a target object is received through a first receiving lens 72A, which focuses the received radiation along a receiving optical axis 271. The received radiation passes to a second lens element 72B, which serves to further focus the received radiation onto a radiation detector 170. This system also includes a filter 74, that may be highly transmissive to red colors. Alternatively, the filter 74 might be an infrared bandpass filter, or any other type of filter, as would be known to persons skilled in the art. The filter 74 is matched to the receiving lens system and detector 170. The detector 170 may be a photodiode-type detector, such as an avalanche photodiode (APD), or any other type of photodiode, as would be well known to those of skill in the art.

The combined sight 120 located on the top of the device 100 functions as both a head-up display and a targeting sight for aiming the device at a desired target. The combined sight includes a combining sight member 24, which is transmissive and reflective. Light reflected from a target object is intended to pass from a first side 24B of the combining sight, through the sight member 24, and toward a user's eye along an optical axis 22. In addition, light from a light emitting display 128 is intended to be reflected from a second side 24A of the combined sight 24, so that the light from the display 128 also passes toward the user's eye along the optical axis 22.

Figure 8:
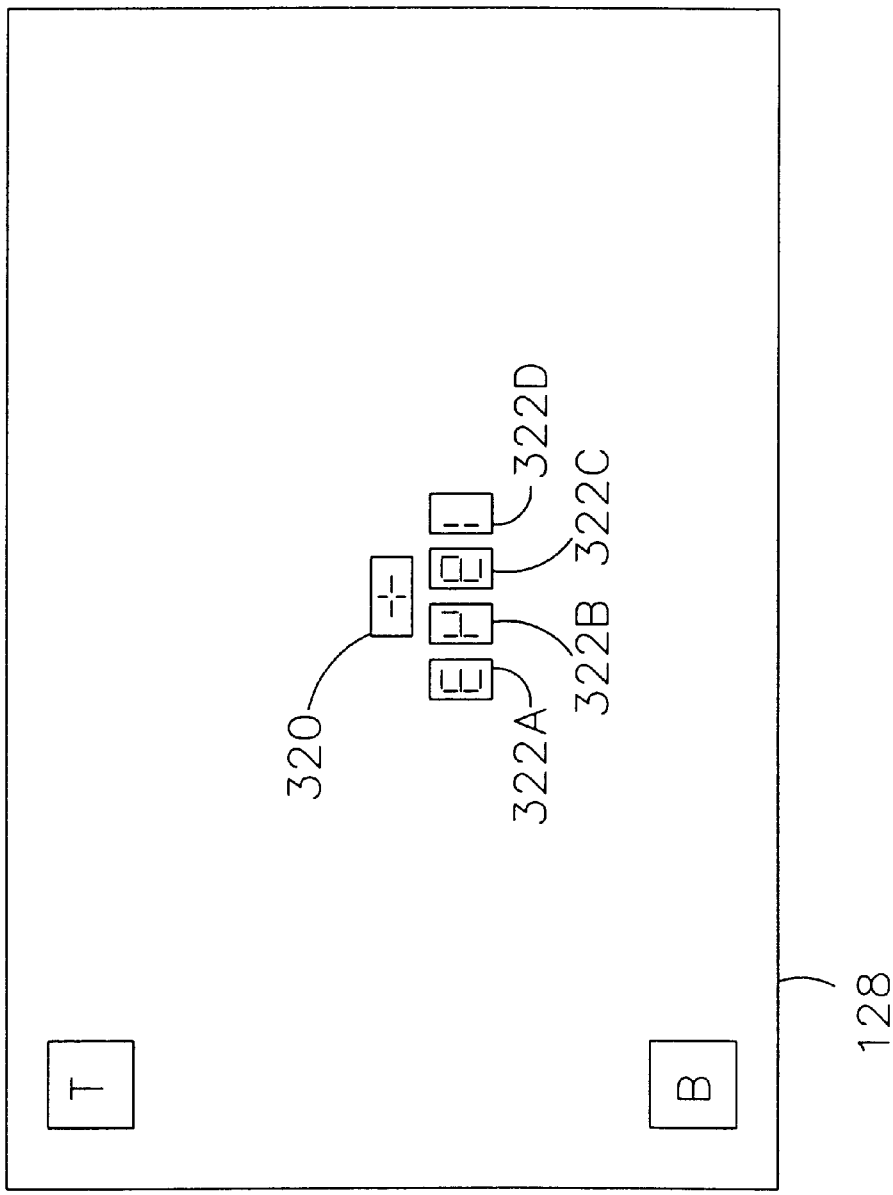
FIG. 8 is a diagram showing a light emitting device for use with a head-up display of a device embodying the invention.

The light emitting display 128 is shown in greater detail in FIG. 8. The display includes an illuminated reticle 320 and illuminated information areas 322A–322D. The information areas can be light emitting displays capable of displaying alphanumeric characters, or any other sort of similar device capable of emitting light in a user recognizable pattern. In a preferred embodiment, the information areas 322A–322D are comprised of extremely small light emitting elements arranged in a pattern so that characters or numerals may be formed by selectively activating various ones of the elements, as is well known in the art. In FIG. 8, the information areas 322A–322D are generating a mirror image of the number 1943. When the image is reflected from the second side 24A of the combined sight 24, the numerals will appear normal to the operator.

Because prior art head up displays used relatively large light emitting displays, it was necessary to have a large optical path between the light emitting display and the combining sight of the head-up-display. As described above, this required the use of a folding mirror and multiple optical elements to properly focus the image from the light emitting display on the combining sight. Because the information areas of a light emitting display of a device embodying the invention form an extremely small image, it is possible to locate the light emitting display very close to the combining sight 24 while still properly focusing the image on the combining sight 24. As shown in FIG. 4, in one preferred embodiment, the light emitting display is located between the emitter 180 and the detector 170.

The image formed by light emitted from the light emitting display 128 passes through a combined lens element 25, which has first and second lens elements 25A and 25B. The image then passes through a filter 231, and onto the second side 24A of the combined sight 24. The image light is reflected from the second side 24A along the optical axis 22 towards a user's eye. The optical paths of the light from the light emitting display 128 and the radiation emitted by the emitter 180 cross one another. The filter 231 is designed to prevent radiation energy generated by the emitter 180 from passing from the emitter to the user's eye, via the combining sight assembly 24. The filter 231 prevents the passage of radiation at the wavelengths generated by the emitter, while allowing the wavelengths of light generated by the light emitting display 128 to pass unobstructed.

In a preferred embodiment, the light emitting display generates light primarily in the red band of the spectrum. For this reason, either or both of the first and second sides 24A and 24B of the combining sight 24 are coated such that a large percentage of light in the red wavelength band, which is generated by the light emitting display 128, is reflected from the combining sight 24 to the user's eye. Conversely, a large percentage of light outside the red wavelength band is allowed to pass through the combining sight 24, so that light from a target object can easily pass to the user's eye. The result is that the target image is bright and easy to see through the combining sight 24, while the majority of the light generated by the light emitting display 128 is reflected to the user's eye so that the target information is also bright and easy to see.

The optical elements used to project the image from the light emitting display 128 onto the combining sight 24 are designed so that the image appears to be located a great distance from the operator. Thus, the operator can focus his eye a great distance away, and simultaneously see both the intended target and the information presented by the light emitting display 128.

Figure 5:
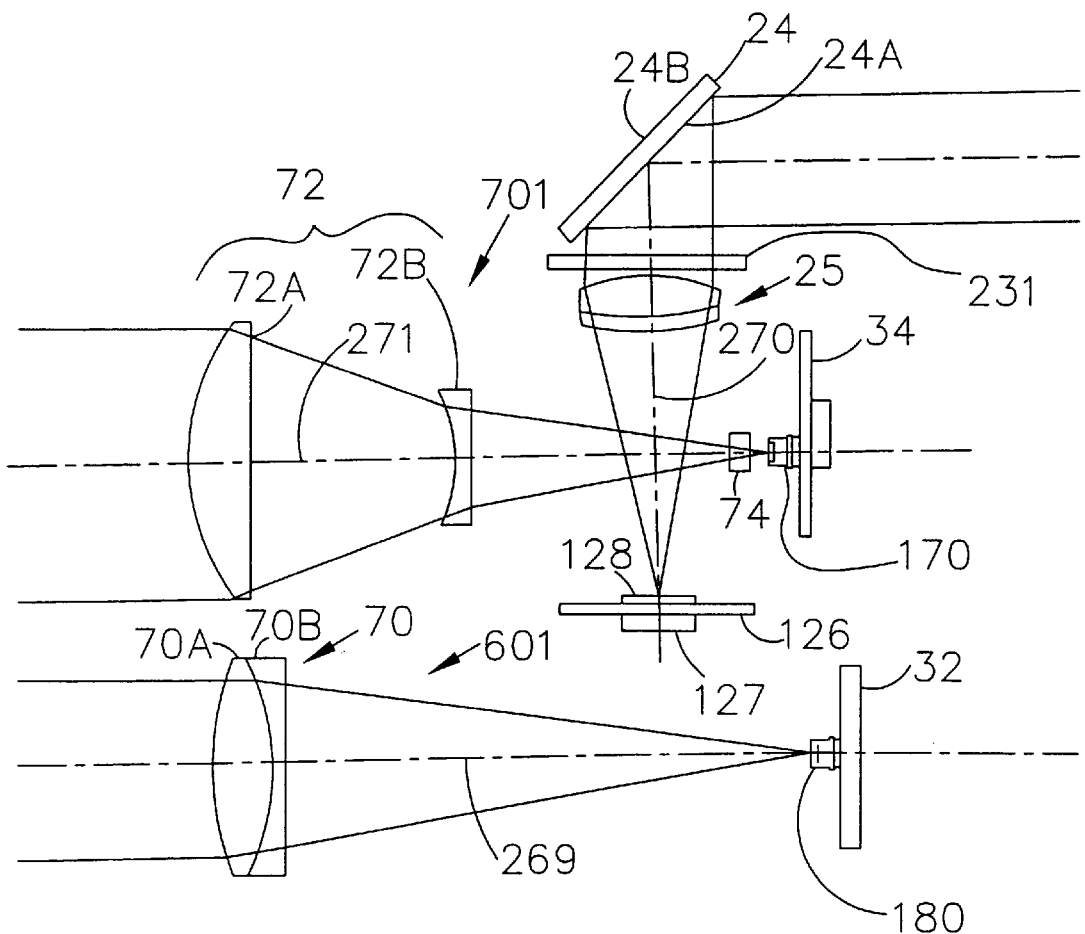
FIG. 5 is a diagram showing emitting and receiving elements and elements of a head-up display of a device embodying the invention.

FIG. 5 shows another embodiment of the invention wherein the transmitter and receiver paths have been switched. In this embodiment, the laser emitter 180 is on the bottom of the device, and the detector 170 is at the top of the device. A light emitting display 128 is still located between the emitter and the detector, and the optical paths of the received laser radiation and the light emitted from the light emitting device 128 cross one another.

Figure 6:
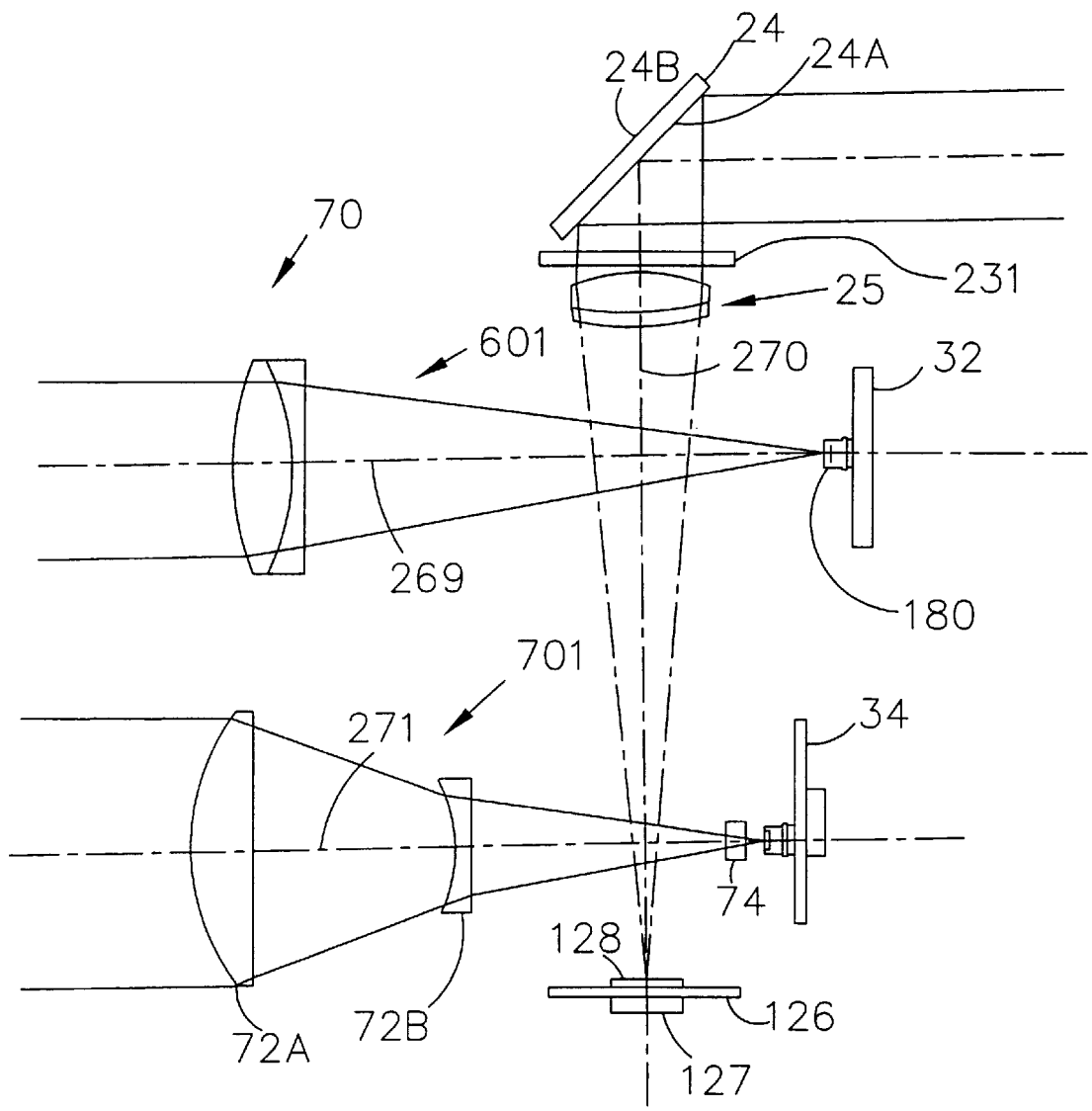
FIG. 6 is a diagram of emitting and receiving elements and elements of a head-up display of a device embodying the invention.

FIG. 6 shows yet another embodiment of the invention wherein the light emitting display 128 is located beneath both the laser emitter 180 and the laser detector 170. The light emitting display 128 could also be located above both the emitter and the detector, providing the image from the light emitting display 128 can still be properly focused on the combined sight element 24.

As can be seen in FIGS. 4–6, the transmitting optical axis 269 and the receiving optical axis 271 are bistatic, i.e., they are separate and non-coaxial. This allows the device to be constructed with small diameter lenses which reduce the cost, size and weight of the device. If the transmit and receive paths were coaxial, larger diameter lenses would be necessary, which would increase the weight, cost and size of the device.

In a preferred embodiment of the device, the receiving lens system is "thermalized." A thermalization of the receiving lens system is needed to provide the laser rangefinder with the ability to operate in diverse environmental conditions without loss of range or precision. Thermalization prevents blurring of the focused spot of received radiation that is produced by the receiving lens system. Thermalization is a system solution taking into account the type and refractive indices of the materials comprising the receiving lens system, the spacing of the lenses 72A and 72B, and the coefficient of thermal expansion of these materials and any parts supporting the lenses 72A and 72B. Furthermore, the filter 74 may be temperature-tuned or temperature compensated.

Figure 7:
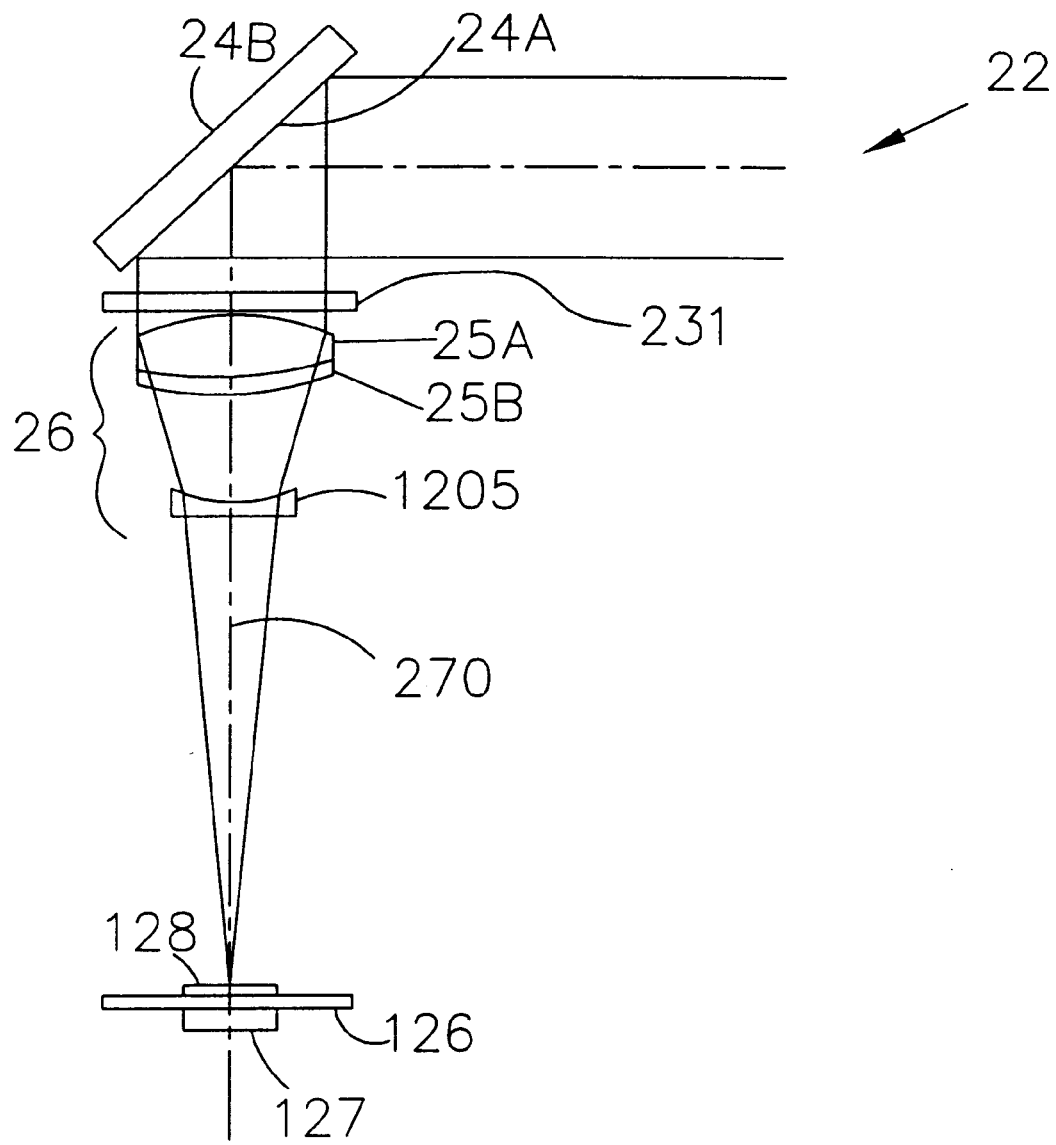
FIG. 7 is a diagram of elements of a head-up display that can be used with a device embodying the invention.

FIG. 7 shows another arrangement of the optical elements 26 used to focus the image from the light emitting display 128. In this embodiment, a telephoto lens arrangement 26 is used to focus the image from the light emitting display 128 onto the second side 24A of the combined sight 24. Because the telephoto lens system 26 has no folding mirror, there is simple straight optical axis 270 between the light emitting display 128 and the combined sight 24.

Figure 9:
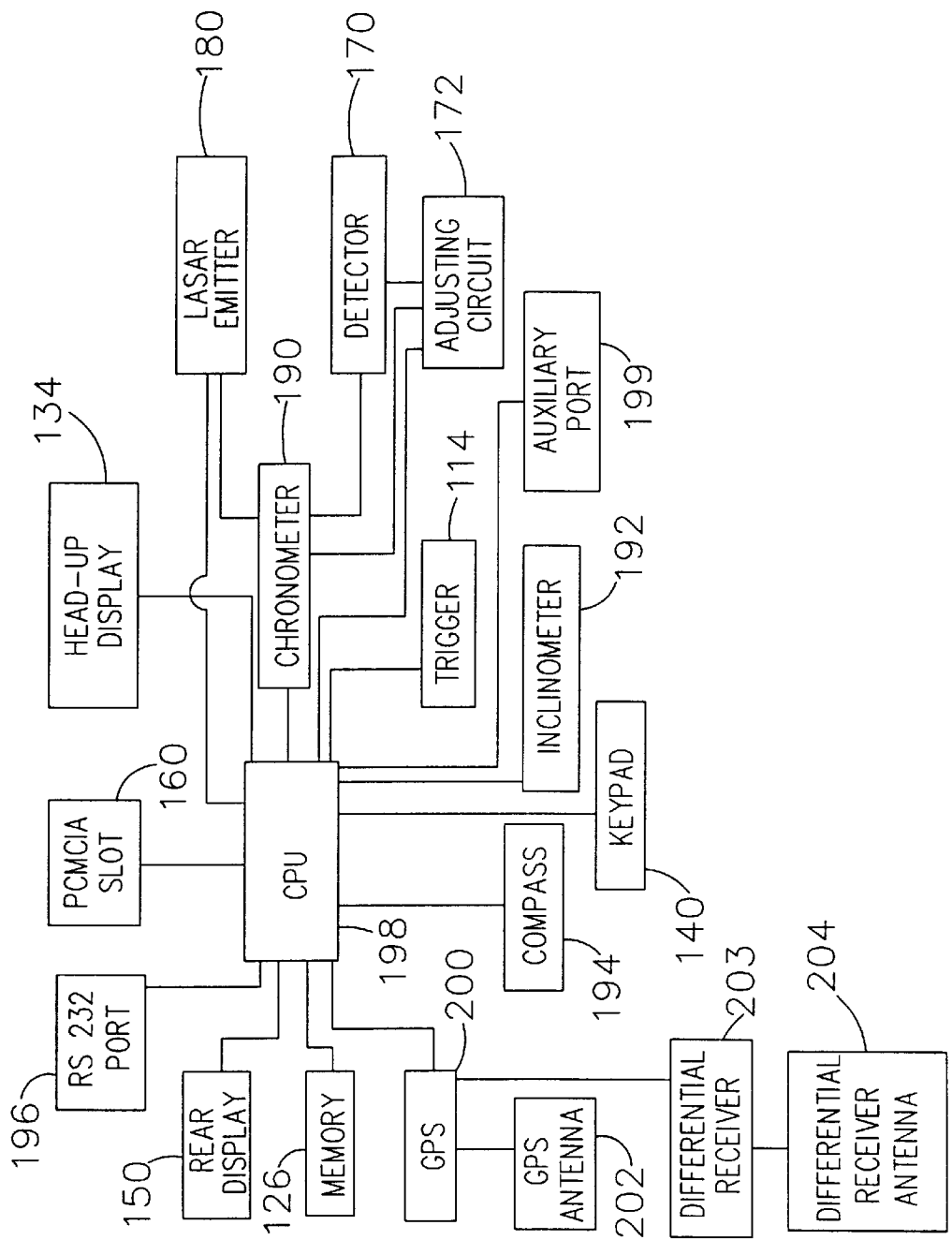
FIG. 9 is a block diagram of the major elements of a device embodying the invention.

FIG. 9 shows a block diagram of the major elements of a system embodying the invention. The system includes a central processing unit 198 connected to a laser emitter 180 and a laser detector 170 through a chronometer 190. An adjusting circuit 172 is connected to the detector 170, chronometer 190 and CPU 198. The adjusting circuit 172 adjusts the detector sensitivity for varying environmental conditions and other factors. The CPU 198 is also connected to a head-up display 134, which includes sight electronics that drive a light emitting display. A trigger 114 is connected to the CPU 198 and generates an electrical signal instructing the CPU to conduct a rangefinding or speed determination operation. The CPU 198 is also connected to an electronic inclinometer 192, a compass 194 and a GPS receiver 200. A GPS antenna 202, which may be mounted on a housing of the device, is connected to the GPS receiver 200. The GPS receiver may also be connected to a differential receiver 203, which is itself connected to a differential receiver antenna 204. A keypad 140, which would typically be mounted on the rear of the device, is also connected to the CPU 198, as is a rear display 150. The CPU 198 is also connected to an RS232 port 196, a PCMCIA slot 160 and an auxiliary port 199 which allows data generated by the device to be exchanged with an external computer or other external unit.

Any of the aforementioned devices that are connected to the CPU 198 may instead be connected to one or more multiplexer units that combine the signals passing to and from a plurality of individual devices that need to communicate with the CPU. This allows for fewer direct connections to the CPU 198.

The chronometer 190 provides precision clock and pulse counting functions that enable the device to determine the time required for an emitted laser pulse to travel to and return from a target object. This is typically known as the "time-of-flight." The CPU uses a time-of-flight measurement to determine the distance between the rangefinding device and the target object. This information can then be used in conjunction with other information from the GPS receiver, the compass, and the inclinometer to determine the exact position of the target object. Also, if range and/or position measurements are made at two different points along a target object, the device can calculate the distance between the two measured points, which allows the device to determine the height or length of target objects. Also, if a series of position measurements are made over a period of time, the series of measurements can be used to determine the speed of a moving target object, as will be explained further below.

A device embodying the invention is capable of accomplishing rangefinding functions, asset surveying functions, position determination functions and speed determination functions. The basis for all these functions is the ability of the device to determine the precise distance between a target object and the device. This basic function is generally known as rangefinding.

To accomplish rangefinding with a device embodying the invention, the operator would hold the device 100 by the handle 112 and look through the combined sight 24 to aim the device at a target object. The user would orient the device so that the cross-hairs of the reticule 122 appear to be positioned over a desired point on the target object, and the user would depress the trigger 114. A trigger signal would then be sent from the trigger 114 to the CPU 198. When the trigger signal is detected by the CPU 198, a measurement cycle is initiated by the device. Depending upon the mode in which the device is operating, the trigger signal may cause the device to carry out a single range measurement, or a plurality of measurements that are averaged to determine a distance to the target object. Also, if the trigger is held down, the device may continue to carry out range measurements until the trigger is released, and the displays may be continuously updated while the trigger is depressed to reflect the latest range determinations made by the device. When the device is operating in a speed detecting mode, the range measurements would be used to calculate a speed of the target object.

When the CPU 198 detects a trigger signal from the trigger 114, it sends a firing signal to the laser emitter 180. In response, the emitter 180 emits a pulse of laser radiation, and it sends a start signal to the chronometer 190 to initiate pulse counting. The start signal from the emitter 180 defines the starting time or zero reference time for a time-of-flight measurement. In an alternative embodiment, a portion of the emitted laser pulse could be directed to the detector 170, which would then generate a start signal that is sent to the chronometer 190 to initiate time keeping functions.

The emitted laser pulse will travel out to the target object, and be reflected back to the rangefinder. When the reflected pulse is detected by the detector 170, the detector 170 sends a stop signal to the chronometer 190. The chronometer 190 allows the device to determine the time of flight based on the start and stop signals. The stop signal will normally be generated when the detector 170 receives a reflected laser pulse. However, the detector may also generate a stop signal if a predetermined period of time elapses after generation of a laser pulse. This prevents the device from waiting for a reflected pulse that never arrives.

The signals generated by the clock allow the device to roughly establish the start and stop times. A rough estimate of the time-of-flight could be established by simply counting the number of clock signals output by the clock device between the generation of the start and stop signals. However, there will almost always be a small fractional time period that elapses between the time a laser pulse is emitted and the time that a first clock signal is generated by the clock device. Likewise, there will almost always be a small fractional time period that elapses between the time that the last clock signal was generated and the time that a reflected laser pulse is detected by the detector 170. It is necessary to account for these small fractional time periods to ensure that the distance measurements provided by the system are as accurate as possible. The fractional time periods must be added to the time period determined by counting clock signals to arrive at the actual amount of time that elapses between emission of the laser pulse and detection of the reflected laser pulse.

Equation (1) gives a formula for determining the range to a target object.

$$\text{Range} = \frac{NTc}{2} + f(R_1, R_2) \qquad (1)$$

In equation (1), N represents the number of clock signals output by a clock device, T represents the time that elapses between each clock signal, and c represents the speed of light. The first half of the equation yields the distance that a laser pulse travels between the time the first clock signal occurs after the laser pulse is emitted and the time that the last clock signal occurs before the reflected laser pulse is received back at the rangefinder.

The second half of the equation provides a correction factor that accounts for a fractional time period $R_1$ that occurs between the time that the laser pulse is emitted and the time that a first clock signal is generated, and a fractional time period $R_2$ that occurs between the time that the last clock signal is generated and the time that a reflected laser pulse is detected.

Of course, if the emission of a laser pulse and the detection of a reflected laser pulse occur in phase synchronization with the clock signals, the correction factor will be zero, and the first term in Equation (1) gives the range to the target object.

Figure 10:
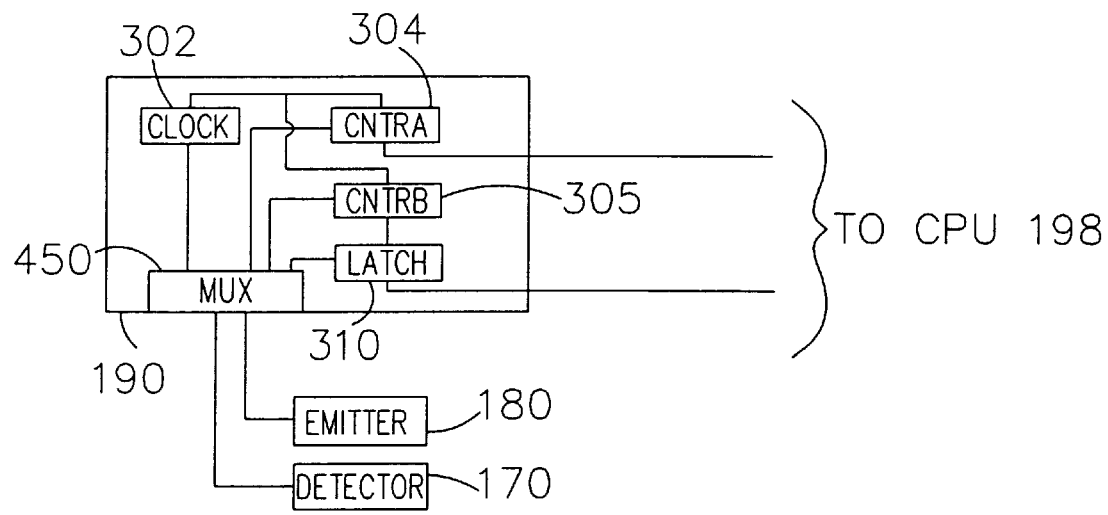
FIG. 10 is diagram for use in explaining how a chronometer of a device embodying the invention operates.

FIG. 10 illustrates details of the chronometer and how time counting is accomplished. The chronometer includes a clock 302, a multiplexer (MUX) 450, a counter CNTRA 304 that functions as a coarse time counter, a counter CNTRB 305 that functions as a vernier or fine time counter, and a latch LATCH 310.

The course counter CNTRA 304 simply records the number of the last clock pulse output by the clock 302. The number of the clock pulse can then be read by the CPU 198 through a control line.

The vernier counter CNTRB 305 is comprised of an analog delay line. The clock 302 outputs clock signals into the delay line, and the rising and falling edges of each clock signal propagates through the delay line. The delay line has multiple output lines, or "taps," each of which is capable of outputting either a high or a low signal depending on whether the rising and falling edges of a clock pulse have passed the tap.

Figure 11:
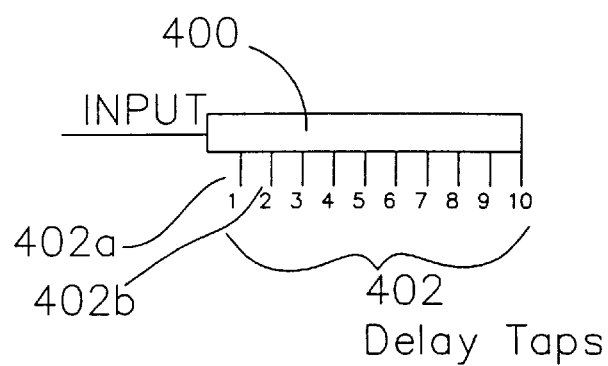
FIG. 11 is a diagram of an electronic delay tap.

A functional diagram of a delay line is shown in FIG. 11. The delay line 400 includes multiple delay taps 402 that can be connected to a latch. When a signal is applied to the input, the signal will propagate through the delay line from left to right. The delay line shown in FIG. 11 is a 10 tap delay line. If the delay is 2 nanoseconds between each tap, it would take 2 nanoseconds for the rising edge of an input signal to reach the first tap line 402a, at which point the state of the first tap line would change. It would then take another 2 nanoseconds for the rising edge of the input signal to reach the second tap line 402b, at which point the second tap line would change state. If the states of all the tap lines are latched upon the occurrence of a certain event, the states of the tap lines can be used to determine the length of time, to within 2 nanoseconds, that has elapsed between the time the input signal was applied to the input, and the time that the event occurred.

When the start signal is generated by the emitter 180, or the stop signal is generated by the detector 170, the states of each of the taps of the vernier counter CNTRB 305 are latched by LATCH 310. The CPU can then read the latch, and see which of the delay lines were high and which of the delay lines were low at the time the start or stop signals were generated. This, in turn, allows the CPU to determine the length of the fractional time period that passes between the generation of the start signal and the generation of the next clock signal, or the length of the fractional time period that occurs between the generation of the last clock signal and the generation of a start or stop signal.

In a preferred embodiment of the invention, the fractional time periods may be determined in the following manner. When the laser emitter 180 emits a pulse of laser radiation, the states of tap lines of the delay module are latched. Then, the CPU reads the number of the last clock signal stored in CNTRA 304, and the states of the tap lines of the delay module of CNTRB 305 that were stored in the latch 310. This allows the CPU 198 to establish a start time.

When the detector 170 detects a pulse of reflected radiation, the detector 170 sends a stop signal to the chronometer 190. This causes the states of the tap line of the CNTRB 305 to again be latched into the latch 310. The CPU 198 can then read the number of the last clock signal stored in the CNTRA 304 and the states of the tap lines of the delay module stored in the latch 310. This allows the CPU 198 to establish a stop time.

The CPU can then subtract the start time from the stop time to determine the time of flight.

In other embodiments of the invention, the contents of CNTRA 304 could be set to zero, and the states of the tap lines of CNTRB 305 latched into the latch 310 when the emitter emits a pulse of radiation. The CPU 198 would then record the states of the tap lines stored in the latch at the start time. Then, when the detector 170 receives a reflected pulse of radiation, the states of the tap lines of CNTRB 305 could again be latched into the latch 310. The CPU could then read the number of clock pulses that have occurred between the start and stop times, which will be stored in CNTRA 304, and the states of the tap lines stored in the latch 310. The CPU could then determine the time of flight based on the number of elapsed clock pulses and the states of the tap lines at the start and stop times using an equation similar to equation (1).

Figure 14:
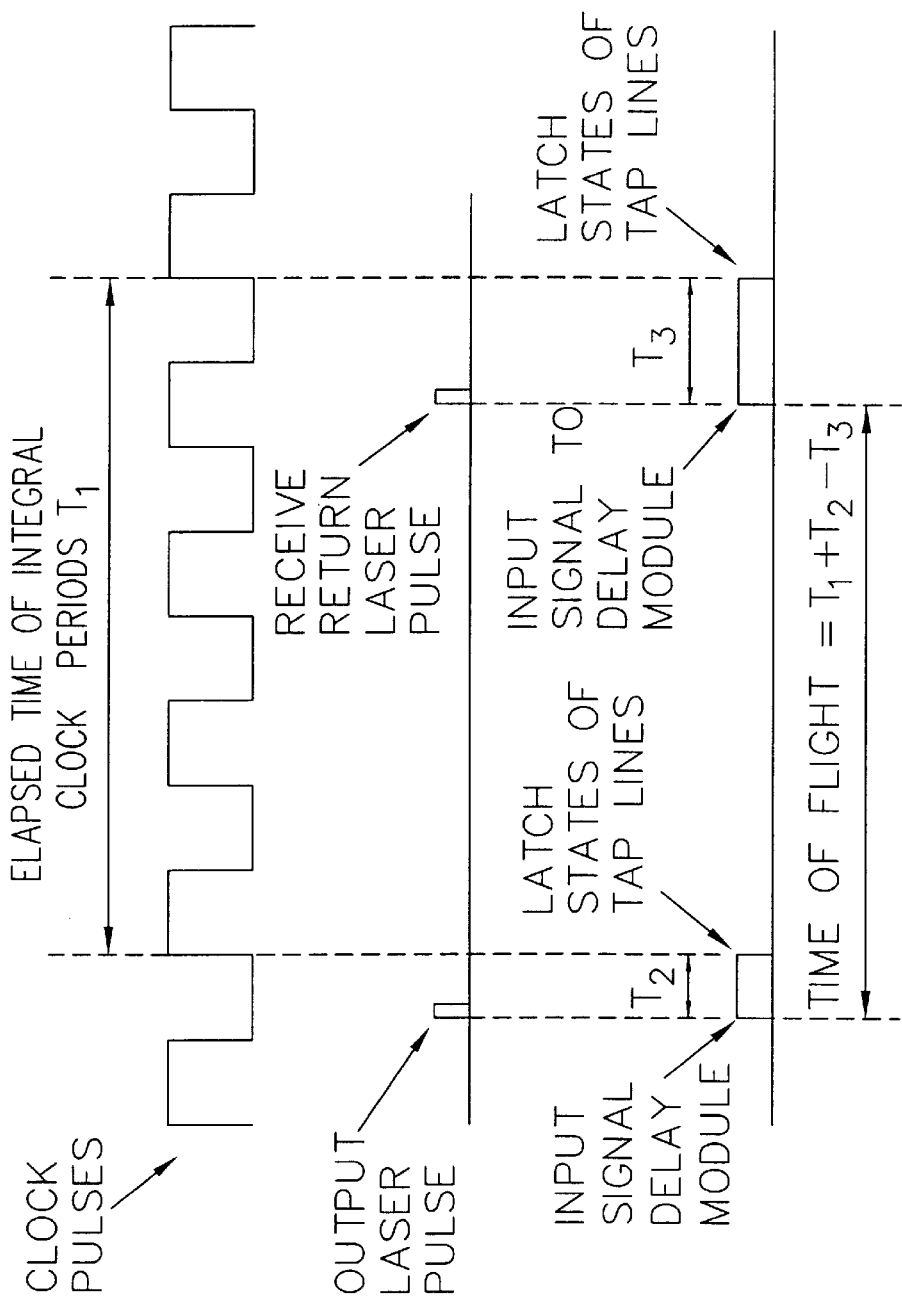
FIG. 14 is a diagram illustrating one method of calculating a time of flight of a pulse of laser radiation.

In yet another alternate embodiment, as shown in FIG. 14, the time of flight for a pulse of laser radiation could be determined by inputting signals into the delay modules at the time a pulse of laser radiation is emitted and at the time a reflected pulse of radiation is detected. In this method, when the laser emitter 180 generates a pulse of radiation, a signal is sent to the chronometer which causes an input signal to be input into an electronic delay module. Then, when the next clock pulse is output by the clock device, the states of each of the tap lines of the delay module are latched. The number of the last clock signal, and the states of the tap lines can then be recorded by the CPU 198.

When a reflected pulse of laser radiation is detected by the detector 170, a stop signal can be input to the chronometer. The stop signal would cause a signal to be input into the delay module. Then, when the clock device outputs its next clock signal, the states of each of the tap lines of the delay module could be latched. The number of the last clock pulse and the states of the tap lines can then be recorded by the CPU 198. The time of flight can then be calculated based on the recorded numbers of the clock pulses and the latched states of the tap lines.

In the description and claims that follow, reference is made to determining a start time, determining a stop time, and determining a time of flight based on the start and stop times. These terms are intended to encompass methods where pulses are counted between the start and stop times to calculate a time of flight, methods where a start and stop time are established and one is subtracted from the other to calculate a time of flight, and methods such as the one described immediately above, where signals are input to a delay module when a pulse is generated and detected, and where the states of tap lines of the delay module are latched upon occurrence of the next clock signal.

In some preferred embodiments, the stop or end time can be established, in part, by examining a width or duration of a reflected pulse of radiation. When a pulse of radiation is emitted by the measuring device towards a target object, the pulse will have a "width" or duration. A portion of the pulse will be reflected from the target object back towards the measuring device. Due to scattering and other environmental effects, the entire pulse may not be received back at the measuring device, and/or a portion of the reflected pulse may be attenuated to the point that it is not detectable by the detector. For instance, a black target will absorb a much greater portion of a pulse of radiation than a white or highly reflective target.

Figure 15:
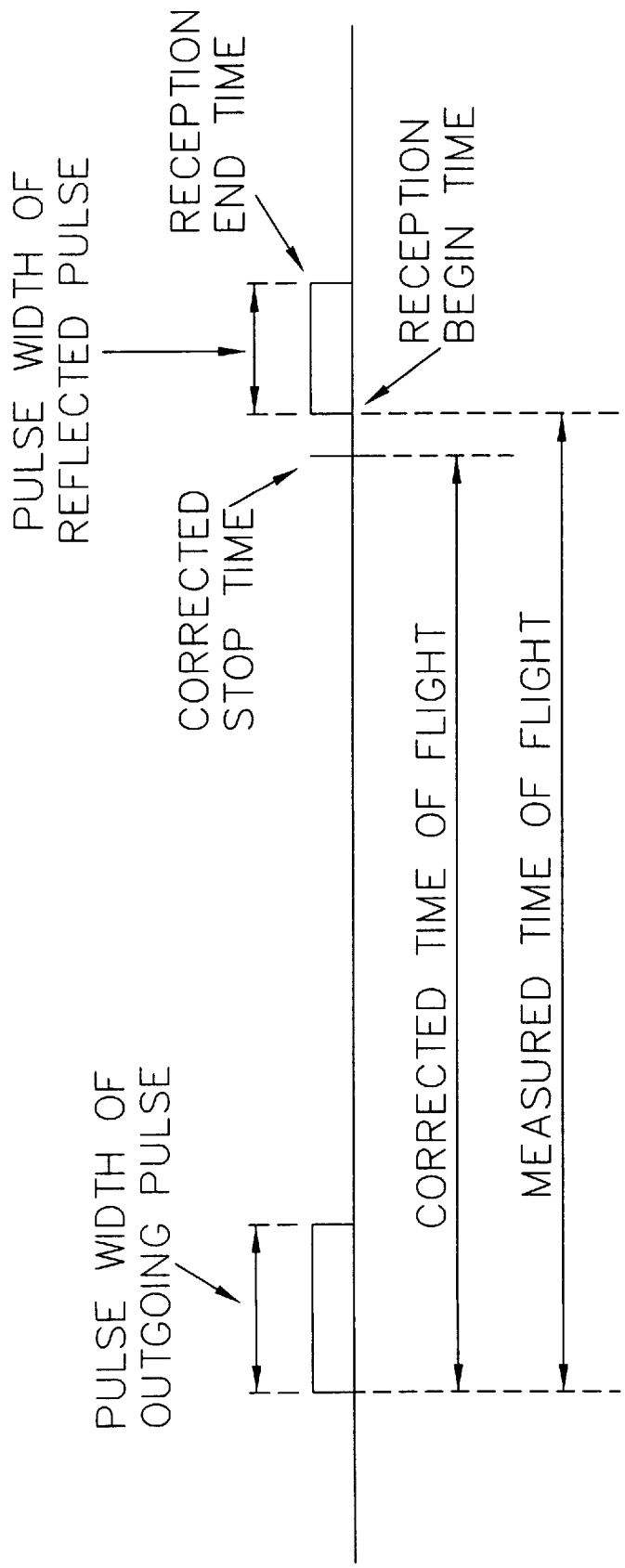
FIG. 15 is a diagram illustrating how a corrected time of flight for a pulse of radiation is calculated.

To establish a more accurate time of flight, as shown in FIG. 15, the measuring device may measure the pulse width of a reflected pulse of radiation by determining a time that a reflected pulse is first received, and a time that reception of the reflected pulse ends. Ideally, the width of the pulse of the reflected radiation would equal the width of the emitted pulse. However, the width of the reflected pulse is often smaller than the width of the emitted pulse because the strength or amplitude of the leading edge of the reflected pulse is not sufficiently great to be detected by the detector. To account for this problem, a correction factor can be applied to the time that the reflected pulse is first detected, the correction factor being based on the measured width of the reflected pulse relative to the width of the emitted pulse. The corrected stop time can then be used as the stop or end time to determine the time of flight, as described above.

In a preferred embodiment, the vernier counter 305 comprises a 10 tap, 20 nanosecond delay line. In such a delay line, it requires approximately 2 nanoseconds for a signal to travel between each tap, and thus, 20 nanoseconds for a signal to propagate all the way through the 10 tap delay line. In this embodiment, the CPU would be able to determine the length of fractional time periods to within 2 nanoseconds. If the delay lines had a greater number of taps for the same overall delay, or if they operated for a shorter overall delay time with the same number of taps, the CPU would be able to determine the length of the fractional time periods with even greater accuracy.

The system may also include means for blanking, or suppressing, the stop signal from the detector for a predetermined period of time immediately after the emitter generates a laser pulse. Blanking prevents unwanted or spurious signals generated immediately after the emitter fires from prematurely stopping the counting process. Unwanted signals may be generated due to electromagnetic interference (EMI) that occurs during the emitter firing event. The blanking period would typically last from 20 to 100 nanoseconds after the transmitter fires.

Figure 12:
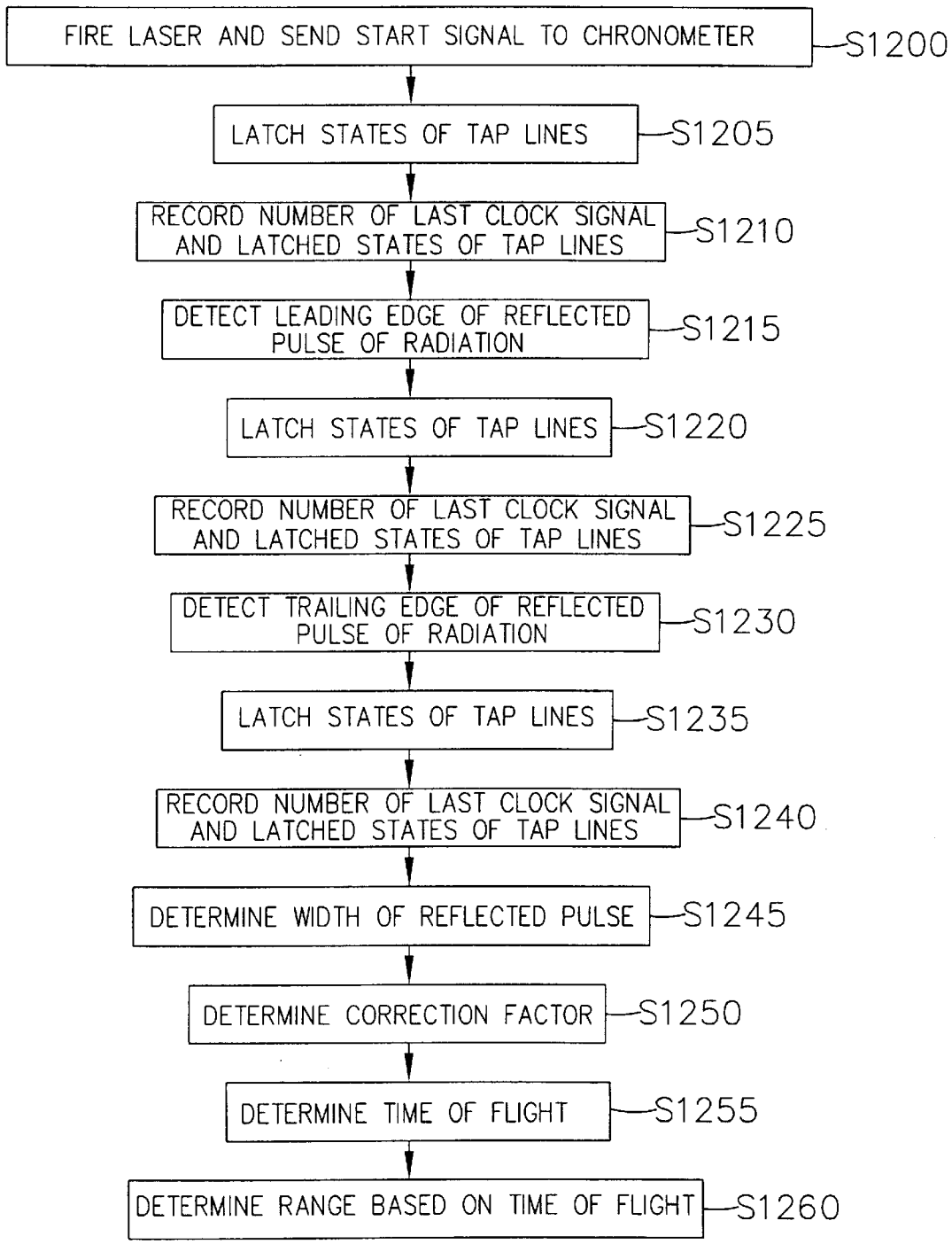
FIG. 12 shows the steps of a range determination method embodying the invention.
Figure 13A:
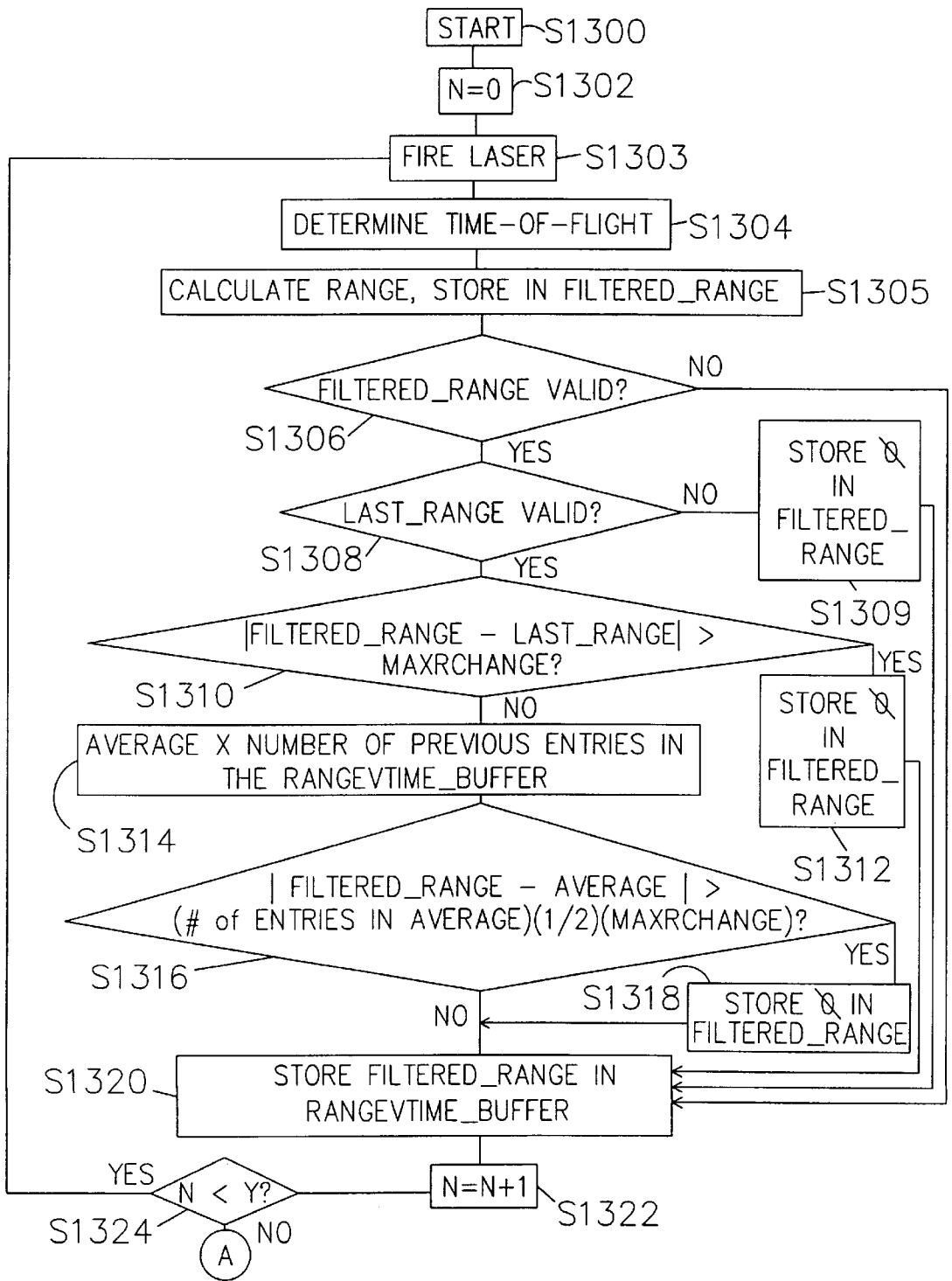
FIGS. 13A, 13B, 13C and 13D show the steps of a speed measuring method embodying the invention.
Figure 13B:
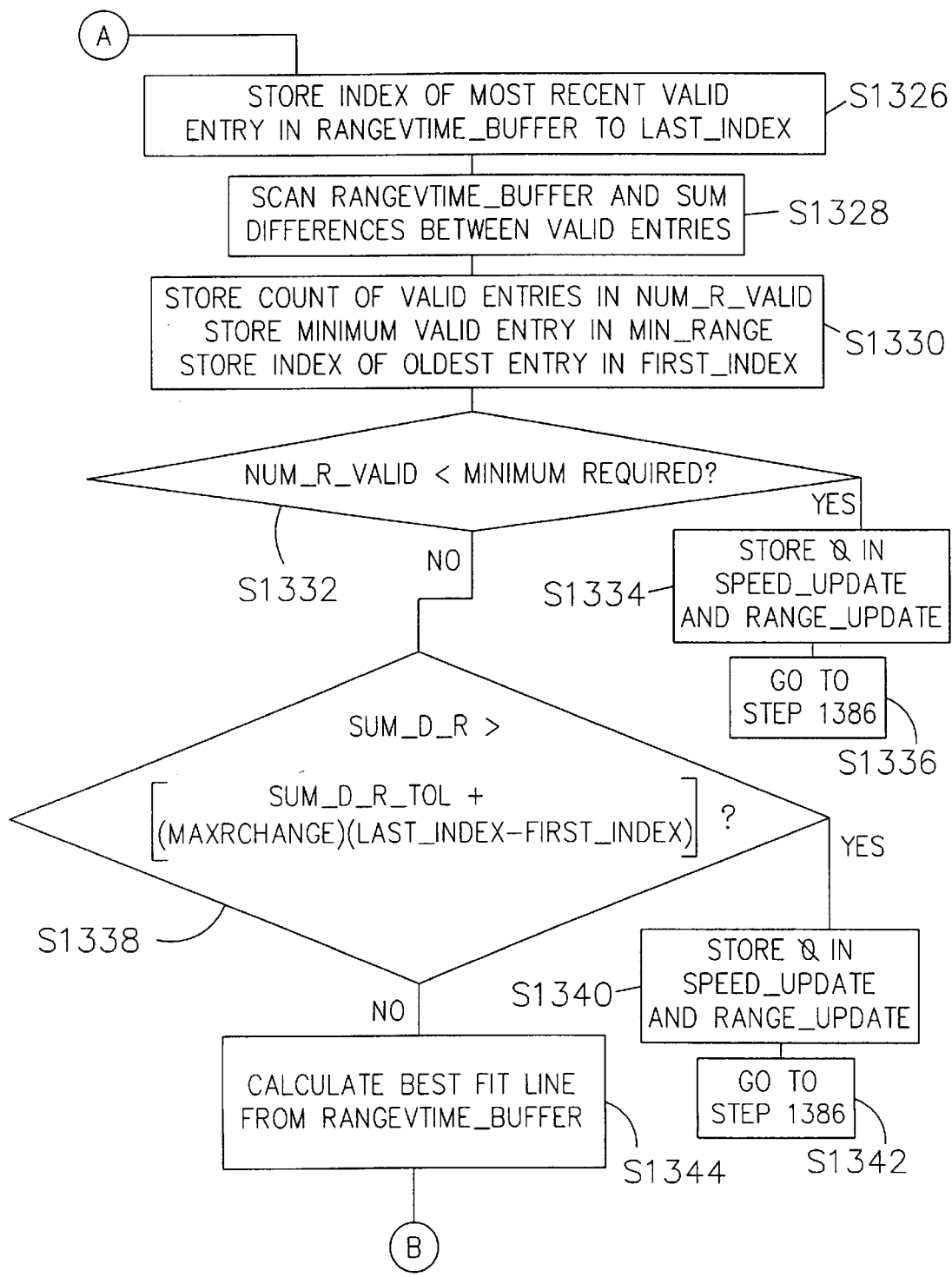
Figure 13C:
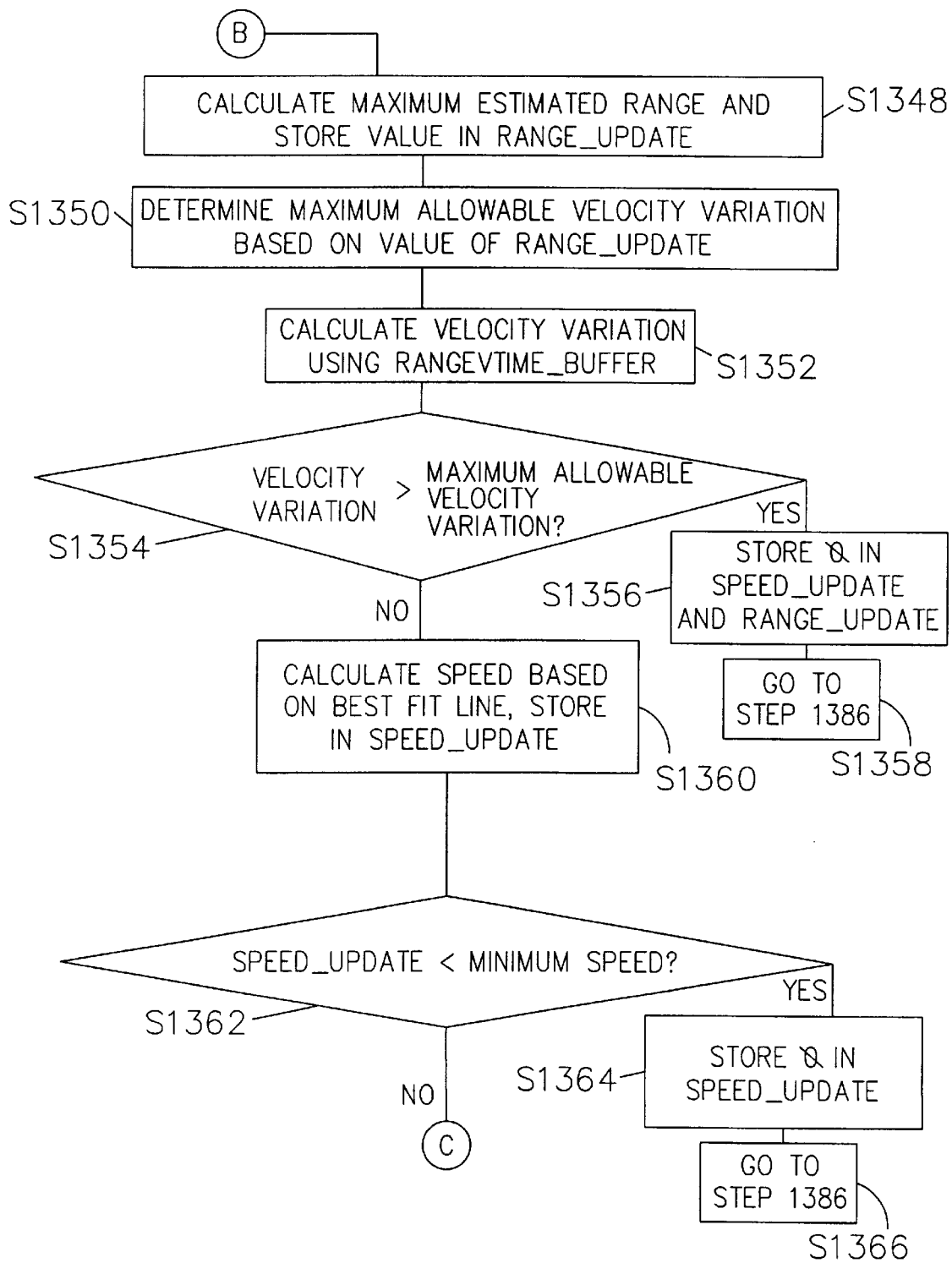
Figure 13D:
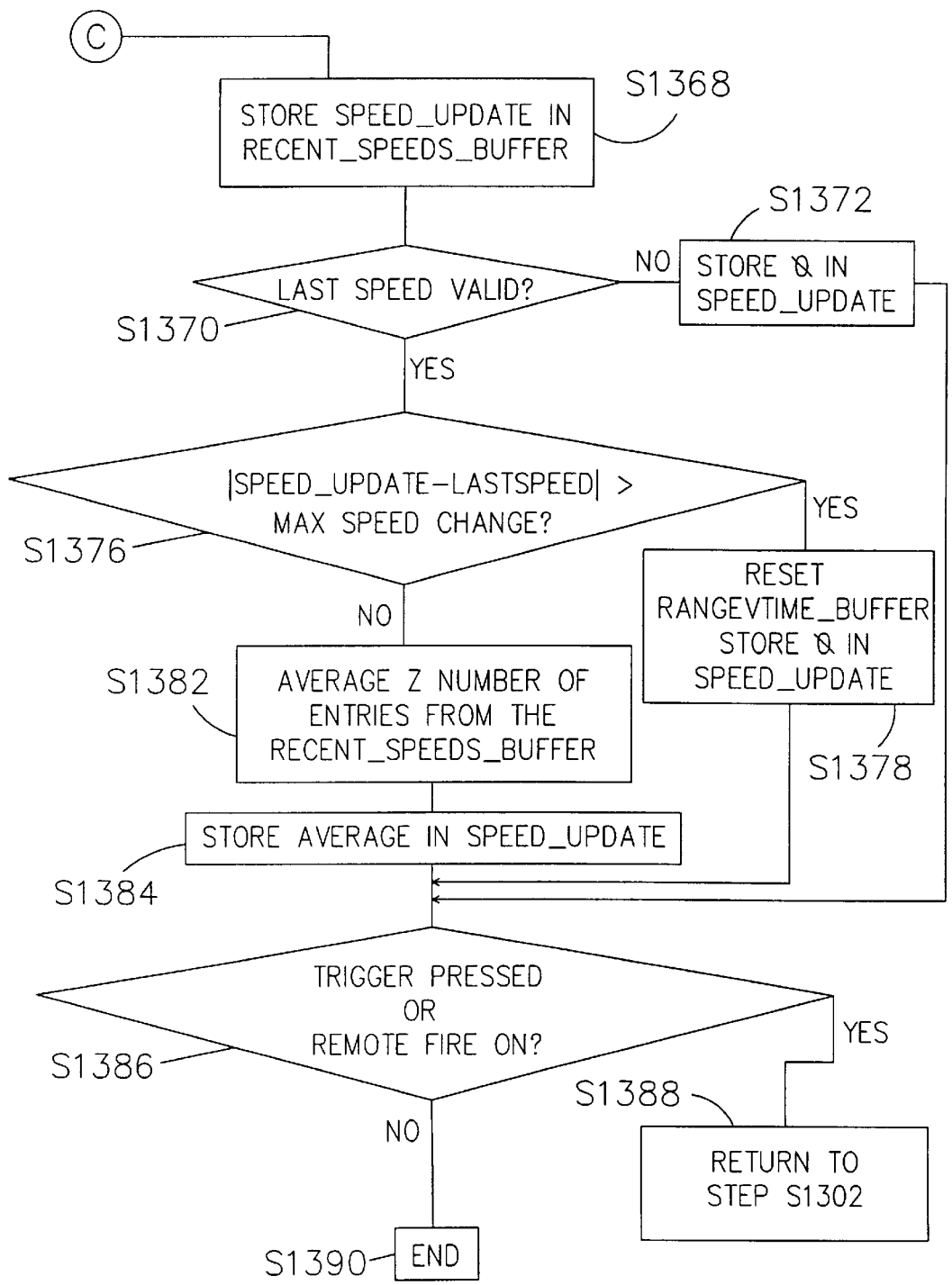

A range determination method embodying the invention will now be described with reference to FIG. 12.

In step 1200, the laser emitter fires a pulse of laser radiation at a target object. At the same time, a start signal is sent to the chronometer to initiate time keeping functions. In step 1205, the states of a delay tap lines are latched. In step 1210, the number of the last clock signal stored in the course counter, and the latched states of the tap lines are recorded.

The emitted pulse of laser radiation will be reflected from the target object back towards the range determination device. In step 1215, the device detects the leading edge of returned laser pulse and sends a stop signal to the chronometer. In step 1220, the states of each of the tap lines of the delay module are latched. In step 1225, the number of the last clock signal recorded in the coarse counter and the latched states of the tap lines are recorded.

In step 1230, the trailing edge of the reflected pulse of laser radiation is detected and another signal is sent to the chronometer. In step 1235, the states of the tap lines are again latched. In step 1240, the number of the last clock signal recorded in the course counter and the latched states of the tap lines are again recorded.

In step 1245, the width of the reflected pulse of radiation is determined based on the numbers of the recorded clock signals and the latched states of the tap lines that were recorded when the leading and trailing edges of the reflected pulse of laser radiation were detected. In step 1250, a correction factor is determined based on the determined width of the reflected pulse. The correction factor may be stored in a look up table accessible in a memory.

In step 1255, the time of flight for the pulse of radiation is determined based on the beginning time, as reflected by the number of the clock signal and the latched states of the tap lines when the pulse of laser radiation was emitted, and a stop time which is based on the number of clock signals and latched states of the tap lines recorded when the leading edge of the pulse is detected and based on the correction factor. In step 1260, the range to the target is calculated based on the determined time of flight.

As mentioned above, a device embodying the invention can record a series of ranges to a target object over time, and then determine the speed of the target object from the series of ranges. Such a method will now be described with reference to FIGS. 13A–13D.

The speed determination method makes use of two data buffers and a variety of variables. A first data buffer called RANGEVTIME_BUFFER holds a plurality of ranges that have been calculated by the device. Each time the device calculates a range, the result is stored in the RANGEVTIME_BUFFER. Each entry in the RANGEVTIME_BUFFER has a different index number. Once the data buffer is full, each time a new entry is made, the oldest entry is removed from the data buffer. A similar data buffer called RECENT SPEEDS_BUFFER holds a plurality of speeds that have been determined by the device.

In step 1302, the variable N is set to 0. In step 1304, the laser emitter fires a pulse of laser radiation at a target object. The device then determines the time of flight in step 1304, using a process like the one described above in conjunction with FIG. 12. In step 1305, the device calculates the range to the target object, based on the time of flight, and stores the calculated range in a variable called FILTERED_RANGE.

In step 1306, a check is made to see if the calculated range stored in the FILTERED_RANGE variable is valid. If not, the process goes directly to step 1320. If FILTERED_RANGE is valid, the method proceeds to step 1308, where a check is made to determine if the value of a variable LAST_RANGE is valid. If not, the method it proceeds to step 1309, where 0 is stored in the variable FILTERED_RANGE, and the method then proceeds directly to step 1320. If the value of LAST_RANGE is valid, the method proceeds to step 1310.

In step 1310, the value stored in FILTERED_RANGE is compared to the last range that was determined by the device. The last range may have been previously stored in the RANGEVTIME_BUFFER. If the absolute value of the difference between FILTERED_RANGE (the latest calculated range) and LAST_RANGE (the last determined range) is greater than MAXRCHANGE, a maximum transition distance which has been previously stored in the device, the method proceeds to step 1312 where a value of 0 is stored in FILTERED_RANGE. The process would then go to step 1320. If the difference between FILTERED_RANGE and LAST_RANGE is less than MAXRCHANGE, the method proceeds to step 1314 where multiple entries in the RANGEVTIME_BUFFER are averaged to create an average distance. In step 1316, the absolute value of the difference between FILTERED_RANGE, and the average calculated in step 1314 is compared to a value obtained by multiplying the number of entries in the average by one-half and by the maximum transition distance, MAXRCHANGE. If the difference between FILTERED_RANGE and the average is greater than that product, a value of 0 is stored in FILTERED_RANGE in step 1318. If the difference between FILTERED_RANGE and the calculated average is less than the product, in step 1320, the value of FILTERED_RANGE is stored as the latest value in the RANGEVTIME BUFFER. In step 1322, the value of the variable N is incremented by 1. In step 1324, the value of the variable N is compared to a predetermined number Y. If N is less than Y, the method loops back to step 1303 where another range determination is made. If N is greater than or equal to the value of Y, a sufficient number of ranges have been stored in the RANGEVTIME_BUFFER, and the method proceeds to step 1326.

In step 1326, the index number of the most recently stored valid entry in the RANGEVTIME_BUFFER is stored to a variable LAST_INDEX. In step 1328, the valid entries in the RANGEVTIME_BUFFER are examined and a sum of the differences between each of the valid entries is obtained. This sum is stored to a variable SUM_D_R. In step 1330, the total number of valid entries in the RANGEVTIME_BUFFER is stored in a variable NUM_R_VAL. Also, in step 1330, the minimum valid entry in the RANGEVTIME_BUFFER is stored in a variable MIN_RANGE, and the index number of the oldest valid entry in the RANGEVTIME_BUFFER is stored in a variable FIRST_INDEX.

In step 1332, the value of the NUM_R_VAL variable is compared to a minimum number of points that are required to calculate a speed of a target object. If the value of the variable NUM_R_VAL is too small, in step 1334, the value of 0 is stored in the variable SPEED_UPDATE and RANGE_UPDATE, and the method proceeds to step 1386. On the other hand, if it is determined in step 1332 that the value of the NUM_R_VAL variable is larger that the minimum number of required data points, the method proceeds to step 1338.

In step 1338, the sum of the differences between the valid entries in the RANGEVTIME_BUFFER which was stored in the variable SUM_D_R, is compared to a calculated number. The calculated number is the sum of a continuity value and the product of the maximum transition distance and a difference between LAST_INDEX and FIRST_INDEX. If the value of the SUM_D_R variable is greater than this calculated number, in step 1340 a value of 0 is stored in the SPEED_UPDATE and RANGE UPDATE variables, and the method proceeds to step 1386. If the value of the SUM_D_R variable is smaller than this calculated number, the method proceeds to step 1344, where a best fit line passing through each of the values in the RANGEVTIME_BUFFER is calculated using a least squares statistical method.

Next, in step 1348, a maximum estimated range of the target object is calculated and stored in the RANGE_UPDATE variable. In step 1350, a look-up table is used to find a maximum allowable velocity variation for the calculated maximum estimated range stored in the RANGE_UPDATE variable. In step 1352, a velocity variation of the different values stored in the RANGEVTIME_BUFFER is calculated. In step 1354, the calculated velocity variation is compared to the maximum allowable velocity variation. If the velocity variation of the data points in the RANGEVTIME_BUFFER is greater than the maximum allowable velocity variation, in step 1356 a value of 0 is stored in the SPEED_UPDATE and RANGE_UPDATE variables, and the method proceeds to step 1386. If the velocity variation is lower than the maximum allowable velocity variation, the method proceeds to step 1360, where a speed of the target object is determined based on the slope of the calculated best fit line, and the speed is stored in the variable SPEED UPDATE.

In step 1362, the calculated speed stored in the SPEED_UPDATE variable is compared to a minimum speed. If the value of SPEED_UPDATE is smaller than the minimum speed, a value of 0 is stored in the SPEED_UPDATE variable in step 1364, and the method proceeds to step 1386. Otherwise, the method proceeds to step 1368.

In step 1368, the value of the SPEED_UPDATE variable, which is the last calculated speed, is stored in the RECENT_SPEEDS_BUFFER. Next, in step 1370, the LASTSPEED variable is checked to see if a valid speed is stored in the LASTSPEED variable. If not, in step 1372, 0 is stored in the SPEED_UPDATE variable, and the method proceeds to step 1386. If a valid speed is stored in the LASTSPEED variable, the method proceeds to step 1376.

In step 1376, the absolute value of the difference between the latest calculated speed stored in the variable SPEED_UPDATE and the last determined speed is compared to a maximum allowable speed change. If the difference between the value of SPEED UPDATE and the last determined speed is greater than the maximum allowable speed change, the method proceeds to step 1378, where all the entries in the RANGEVTIME BUFFER are reset to 0 and a value of 0 is stored in the SPEED_UPDATE variable. The method would then proceed to step 1386. If the difference between the value of the SPEED_UPDATE variable and the last determined speed is smaller than the maximum allowable speed change, the method proceeds to step 1382.

In step 1382, an average speed is calculated from a predetermined number of entries in the RECENT_SPEEDS_BUFFER. Next, in step 1384, the average speed in then stored in the SPEED_UPDATE variable. The value of the SPEED_UPDATE variable is then available for display on either the display screen at the back of the device, or for display in the combined sight.

Next, in step 1386, a check is made to determine if the trigger is still depressed, or to see if the remote fire option has been enabled. If either of these conditions exist, the method proceeds to step 1388, which sends the method back to step 1302 to repeat the speed determination process. If neither of these conditions is satisfied, the method ends at step 1390.

The foregoing embodiments are merely exemplary and are not to be construed as limiting of the present invention.

Those of skill in the art will appreciate that may alternatives, modifications, and variations could be made to the systems and methods described above without departing from the spirit and scope of the invention, as defined by the following claims.

What is claimed is:

1. A method of determining a distance to a target object, comprising the steps of:

emitting a pulse of radiation toward the target object;

inputting a signal to an electronic delay module when the pulse of radiation is emitted;

latching states of a plurality of tap lines of the electronic delay module when a first clock signal from a clock is generated after the pulse of radiation is emitted;

determining a start time based on clock signals from a clock and the latched states of the plurality of tap lines;

detecting a portion of the emitted pulse of radiation that is reflected back from the target object;

determining a stop time based on when the reflected radiation is detected;

determining a time of flight for the emitted pulse of radiation to travel to and back from the target object based on the start time and the stop time; and determining a distance to the target object based on the determined time of flight.

2. The method of claim 1, wherein the step of determining a stop time is based on clock signals from a clock and states of a plurality of tap lines of an electronic delay module.

3. The method of claim 1, wherein the step of determining a stop time comprises:

inputting a signal to an electronic delay module when the reflected radiation is detected;

latching states of a plurality of tap lines of the electronic delay module when a first clock signal from a clock is generated after the reflected radiation is detected; and determining the stop time based on clock signals from a clock and the latched states of the plurality of tap lines.

4. The method of claim 1, further comprising a step of determining a pulse width of the reflected radiation, wherein the stop time is determined based on the pulse width of the reflected radiation.

5. The method of claim 4, further comprising the steps of:

comparing the determined width of the reflected radiation to a width of the emitted pulse of radiation; and generating a correction factor based on the results of the comparing step, wherein the step of calculating a corrected reception time is also based on the correction factor.

6. A method of determining a distance to a target object, comprising the steps of:

emitting a pulse of radiation toward a target object;

determining a start time based on when the pulse of radiation is emitted;

determining a beginning reception time when a first portion of the emitted pulse of radiation that is reflected back from the target object is detected;

determining an ending reception time when a last portion of the emitted pulse of radiation that is reflected back from the target object is detected;

determining a width of the reflected radiation based on the beginning reception time and the ending reception time;

calculating a corrected reception time based on the beginning reception time and the width of the reflected radiation;

determining a time-of-flight based on the start time and the corrected reception time; and determining a distance to the target object based on the determined time-of-flight.

7. A method of determining the position of a target object with a position determining device, comprising the steps of:

emitting a pulse of radiation from the device toward the target object;

determining a start time based on when the pulse of radiation is emitted;

detecting a portion of the emitted pulse of radiation that is reflected from the target object back to the device;

inputting a signal to an electronic delay module when the reflected radiation is detected;

latching states of a plurality of tap lines of the electronic delay module when a first clock signal from a clock is generated after the reflected radiation is detected;

determining a stop time based on the latched states of the plurality of tap lines;

determining a time of flight for the emitted pulse of radiation to travel from the device to the target object and back from the target object to the device based on the start and stop times;

determining a distance from the device to the target object based on the determined time of flight;

determining the position of the device; and determining the position of the target object based on the determined position of the device and the determined distance from the device to the target object.

8. The method of claim 7, wherein the step of determining a start time comprises the steps of:

inputting a signal to an electronic delay module when the pulse of radiation is emitted;

latching states of a plurality of tap lines of the electronic delay module when a first clock signal from a clock is generated after the pulse of radiation is emitted; and determining a start time based on clock signals from the clock and the latched states of the plurality of tap lines.

9. A method of determining the speed of a target object, comprising the steps of:

a) emitting a pulse of radiation toward the target object;

b) determining a start time based on when the pulse of radiation is emitted;

c) detecting a portion of the emitted pulse of radiation that is reflected back from the target object;

d) determining a stop time by inputting a signal to an electronic delay module when the reflected radiation is detected, latching states of tap lines of the electronic delay module when a first clock signal is generated by a clock after detection of the reflected radiation, and determining the stop time based on the latched states of the plurality of tap lines;

e) determining a time of flight for the emitted pulse of radiation to travel to and back from the target object based on the start and stop times;

f) determining a distance to the target object based on the determined time of flight;

g) repeating steps (a)–(f) a plurality of times to determine positions of the target object at a corresponding plurality of points in time; and h) determining a speed of the target object based on the plurality of determined positions.

10. The method of claim 9, wherein the step of determining a start time comprises inputting a signal to an electronic delay module when the pulse of radiation is emitted, and latching the states of a plurality of tap lines of the electronic delay module when a first clock signal is generated by a clock after the pulse of radiation is emitted, and wherein the start time is determined based on the latched states of the plurality of tap lines of the electronic delay module.

11. A measuring device, comprising:

a radiation emitter configured to emit a pulse of radiation toward a target object;

a detector configured to generate a signal upon detection of a portion of the emitted pulse of radiation that has been reflected from the target object back to the device;

a clock device configured to output clock signals;

at least one electronic delay module, wherein the delay module includes a plurality of output lines, and wherein states of the output lines change as a signal input to the delay module propagates through the delay module; and a processor, wherein the device is configured to input a signal to the at least one electronic delay module when the radiation emitter emits a pulse of radiation and to latch states of the output lines of the electronic delay module when a first clock signal from the clock device is output after emission of the pulse of radiation, wherein the processor is configured to determine a time of flight required for a pulse of radiation to travel from the emitter, to the target object, and back to the detector based clock signals from the clock device and the latched states of the output lines of the electronic delay module, and wherein the processor is configured to determine a distance from the device to the target object based on the determined time of flight.

12. The measuring device of claim 11, wherein the processor is also configured to determine a plurality of distances from the device to the target object at a corresponding plurality of different times, and wherein the device is configured to determine a speed of the target object based on the plurality of determined distances.

13. The measuring device of claim 11, further comprising a position determiner for determining a position of the device, and wherein the processor is also configured to determine a position of the target object based on a determined position of the device and a determined distance from the device to the target object.

14. The device of claim 11, wherein the device is also configured to input a signal to the at least one electronic delay module when a portion of reflected radiation is detected by the detector, and wherein the states of the output lines of the electronic delay module are latched when a first clock signal is output by the clock device after detection of the reflected radiation.

15. A method of determining a distance to a target object, comprising the steps of:

emitting a pulse of radiation toward the target object;

determining a start time based on when the pulse of radiation is emitted;

detecting a portion of the emitted pulse of radiation that is reflected back from the target object;

inputting a signal to an electronic delay module when the reflected radiation is detected;

latching states of a plurality of tap lines of the electronic delay module when a first clock signal from a clock is generated after the reflected radiation is detected; and determining a stop time based on clock signals from a clock and the latched states of the plurality of tap lines;

determining a time of flight for the emitted pulse of radiation to travel to and back from the target object based on the start time and the stop time; and determining a distance to the target object based on the determined time of flight.

16. The method of claim 15, further comprising a step of determining a pulse width of the reflected radiation, wherein the stop time is also determined based on the pulse width of the reflected radiation.

* * * * *